(12) United States Patent
Kakarlapudi et al.

(10) Patent No.: US 11,010,959 B2
(45) Date of Patent: May 18, 2021

(54) GRAPHICS PROCESSING SYSTEMS

(71) Applicant: ARM Limited, Cambridge (GB)

(72) Inventors: Sandeep Kakarlapudi, Trondheim (NO); Andreas Engh-Halstvedt, Trondheim (NO); Samuel Martin, Cambridgeshire (GB); Edvard Fielding, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/497,129

(22) Filed: Apr. 25, 2017

(65) Prior Publication Data

US 2017/0316601 A1 Nov. 2, 2017

(30) Foreign Application Priority Data

Apr. 29, 2016 (GB) ................................... 1607499

(51) Int. Cl.
*G06T 15/20* (2011.01)
*G09G 5/373* (2006.01)
(Continued)

(52) U.S. Cl.
CPC ............ *G06T 15/205* (2013.01); *G06F 3/011* (2013.01); *G06F 3/013* (2013.01); *G06T 1/20* (2013.01);
(Continued)

(58) Field of Classification Search
CPC ....... G06T 15/205; G06T 17/10; G06T 17/05; G06T 15/005; G06T 19/20; G06T 15/04;
(Continued)

(56) References Cited

U.S. PATENT DOCUMENTS

| | | |
|---|---|---|
| 5,150,454 A | 9/1992 | Wood |
| 5,175,808 A | 12/1992 | Sayre |

(Continued)

FOREIGN PATENT DOCUMENTS

| | | |
|---|---|---|
| CN | 1641702 | 7/2005 |
| EP | 1351195 | 10/2003 |

(Continued)

OTHER PUBLICATIONS

GB Search Report dated Oct. 20, 2016, GB Patent Application No. GB1607499.9.

(Continued)

*Primary Examiner* — Barry Drennan
*Assistant Examiner* — Khoa Vu
(74) *Attorney, Agent, or Firm* — Vierra Magen Marcus LLP

(57) ABSTRACT

When performing foveated rendering, a graphics processor is controlled to render plural, e.g. three, different resolution versions from the same viewpoint for a scene. The rendered different resolution images are then appropriately combined (composited) to provide the output "foveated" image (output frame) that is displayed.
The geometry for the scene is processed and sorted into lists for respective rendering tiles of the images being rendered only once, to provide a single set of tile geometry lists that are then used in common when rendering each respective resolution image.

20 Claims, 9 Drawing Sheets

(51) Int. Cl.

| | | |
|---|---|---|
| *G06F 3/01* | (2006.01) | |
| *G06T 1/20* | (2006.01) | |
| *G06T 15/00* | (2011.01) | |
| *G06T 15/04* | (2011.01) | |
| *G06T 17/05* | (2011.01) | |
| *G06T 17/10* | (2006.01) | |
| *G06T 19/20* | (2011.01) | |
| *G09G 5/14* | (2006.01) | |
| *G06T 1/60* | (2006.01) | |
| *G06T 11/40* | (2006.01) | |

(52) U.S. Cl.
CPC ............ *G06T 15/005* (2013.01); *G06T 15/04* (2013.01); *G06T 17/05* (2013.01); *G06T 17/10* (2013.01); *G06T 19/20* (2013.01); *G09G 5/14* (2013.01); *G09G 5/373* (2013.01); *G06F 3/01* (2013.01); *G06T 1/60* (2013.01); *G06T 11/40* (2013.01); *G06T 2210/36* (2013.01); *G09G 2310/04* (2013.01); *G09G 2360/122* (2013.01)

(58) Field of Classification Search
CPC ......... G06T 1/20; G06T 2210/36; G06T 1/60; G06T 11/04; G09G 5/373; G09G 5/14; G09G 2310/04; G09G 2360/122; G06F 3/013; G06F 3/011; G06F 3/01
See application file for complete search history.

(56) References Cited

U.S. PATENT DOCUMENTS

| | | | |
|---|---|---|---|
| 5,305,430 A | 4/1994 | Glassner | |
| 5,392,385 A | 2/1995 | Evangelisti | |
| 5,500,928 A | 3/1996 | Cook | |
| 5,509,110 A | 4/1996 | Latham | |
| 5,522,018 A | 5/1996 | Takeda | |
| 5,555,358 A | 9/1996 | Blumer | |
| 5,574,836 A | 11/1996 | Broemmelsick | |
| 5,596,685 A | 1/1997 | Ashton | |
| 5,729,672 A | 3/1998 | Ashton | |
| 5,844,571 A | 12/1998 | Narayanaswami | |
| 5,886,701 A | 3/1999 | Chauvin | |
| 5,949,428 A | 9/1999 | Toelle | |
| 6,204,856 B1 | 3/2001 | Wood | |
| 6,288,722 B1 | 9/2001 | Narayanaswami | |
| 6,304,266 B1 | 10/2001 | Li | |
| 6,326,964 B1 | 12/2001 | Snyder | |
| 6,344,852 B1 | 2/2002 | Zhu | |
| 6,552,723 B1 | 4/2003 | Duluk | |
| 6,697,063 B1 | 2/2004 | Zhu | |
| 6,798,410 B1 | 9/2004 | Redshaw | |
| 6,911,985 B1 | 6/2005 | Fujimoto | |
| 7,002,571 B2 | 2/2006 | Lake | |
| 7,138,998 B2 | 11/2006 | Forest | |
| 7,148,890 B2 | 12/2006 | Rice | |
| 7,167,171 B2 | 1/2007 | Heim | |
| 7,324,115 B2 | 1/2008 | Fraser | |
| 7,418,156 B1 | 8/2008 | Candela | |
| 8,681,168 B2 | 3/2014 | Nystad | |
| 8,928,667 B2 | 1/2015 | Nystad | |
| 9,965,886 B2 | 5/2018 | Sorgard | |
| 10,019,920 B2 | 7/2018 | Sorgard | |
| 2002/0015064 A1 | 2/2002 | Robotham | |
| 2003/0142100 A1 | 7/2003 | Lavelle | |
| 2003/0151608 A1 | 8/2003 | Chung | |
| 2003/0227457 A1 | 12/2003 | Pharr | |
| 2004/0066385 A1 | 4/2004 | Ohba | |
| 2004/0095343 A1 | 5/2004 | Forest | |
| 2004/0227767 A1 | 11/2004 | Baroncelli | |
| 2004/0233219 A1* | 11/2004 | Aguera y Arcas | ... G06F 3/0481 345/606 |
| 2005/0275657 A1* | 12/2005 | Hutchins | ............... G06T 15/005 345/506 |
| 2006/0072831 A1 | 4/2006 | Pallister | |
| 2006/0129908 A1 | 6/2006 | Markel | |
| 2006/0170693 A1 | 8/2006 | Bethune | |
| 2007/0101013 A1 | 5/2007 | Howson | |
| 2007/0146378 A1* | 6/2007 | Sorgard | .................. G06T 15/00 345/581 |
| 2007/0165035 A1 | 7/2007 | Duluk | |
| 2008/0012878 A1 | 1/2008 | Nystad | |
| 2008/0150950 A1 | 6/2008 | Sorgard | |
| 2008/0170066 A1 | 7/2008 | Falchetto | |
| 2009/0303245 A1 | 12/2009 | Soupikov | |
| 2010/0177105 A1 | 7/2010 | Nystad | |
| 2011/0280307 A1 | 11/2011 | MacInnis | |
| 2017/0169602 A1* | 6/2017 | Blackmon | ............. G06T 15/005 |
| 2017/0200308 A1* | 7/2017 | Nguyen | ................. G06T 3/0012 |
| 2017/0263046 A1* | 9/2017 | Patney | .................... G06T 15/20 |
| 2017/0293995 A1* | 10/2017 | Saleh | .................... G06T 15/005 |

FOREIGN PATENT DOCUMENTS

| | | |
|---|---|---|
| GB | 2251770 | 7/1992 |
| GB | 2281682 | 3/1995 |
| GB | 2298111 | 8/1996 |
| GB | 2343603 | 5/2000 |
| GB | 2433014 | 6/2007 |
| GB | 2444628 | 6/2008 |
| GB | 2444863 | 6/2008 |
| GB | 2553744 | 3/2018 |
| GB | 2553353 | 7/2018 |
| JP | 2002-526842 | 8/2002 |
| JP | 2003-296747 | 10/2003 |
| JP | 2003-529859 | 10/2003 |
| JP | 2004-348702 | 12/2004 |
| JP | 2004-537129 | 12/2004 |
| JP | 2006-521612 | 9/2006 |
| JP | 2007-157155 | 6/2007 |
| JP | 2008-165760 | 7/2008 |
| WO | WO 90/06561 | 6/1990 |
| WO | WO 95/28685 | 10/1995 |
| WO | WO 97/06512 | 2/1997 |
| WO | WO 98/29838 | 7/1998 |
| WO | WO 00/19377 | 4/2000 |
| WO | WO 00/28483 | 5/2000 |
| WO | WO 01/75803 | 10/2001 |
| WO | WO 01/95257 | 10/2001 |
| WO | WO 03/010717 | 2/2003 |
| WO | WO 2004/066059 | 8/2004 |
| WO | WO 2004/086309 | 10/2004 |
| WO | WO 205/020582 | 3/2005 |
| WO | WO 2005/116930 | 12/2005 |
| WO | 2018/118203 | 6/2018 |
| WO | 2018/175625 | 9/2018 |

OTHER PUBLICATIONS

Crisu et al., 3D Graphics Tile-Based Systolic Scan-Conversion, downloaded Feb. 2010, pp. 517-521.

Crisu et al., Efficient Hardware for Antialiasing Coverage Mask Generation, Jun. 2004, pp. 1-8, (Proceedings of the Computer Graphics International).

Crisu et al., Efficient Hardware for Tile-Based Rasterization, Nov. 2004, pp. 352-357.

Greene et al., Hierarchical Polygon Tiling with Coverage Masks, Jun. 20, 1995, pp. 65-76.

J. Foley et al., Computer Graphics, Second edition, 1990, pp. 668-672.

J. Pineda, "A Parallel Algorithm for Polygon Rasterization" Computer Graphics, vol. 22, No. 4, Aug. 1988, pp. 17-20.

Jason Cross Publication, Intel Lifts the Larrabee Veil a Little, Tile Rendering is Back—CPUs, Boards & Components by Extreme Tech.mht. Aug. 4, 2008.

Kim Jeong Hyun, Hardware-Driven Visibility Culling paper, Document No. 20073114, pp. 1-7, 2007, (http://jupiter.kaist.ac.kr/~sungeui/SGA07/).

M. Cox et al., "Architectural Implications of Hardware-Accelerated Bucket Rendering on the PC" Proceedings of the ACM SIGGRAPH/Eurographics Workshop on Graphics, Agu. 1997, pp. 23-35.

(56) References Cited

OTHER PUBLICATIONS

M. Olano et al. "Triangle, Scan Conversion using 2D Homogeneous Coordinates" Proceedings of the ACM SIGGRAPH/Eurographics Workshop on Graphics, Aug. 1997, pp. 89-95.
Maurice Ribble, gdc2008, Next-Gen Tile-Based GPUs, Feb. 18-22, 2008; San Francisco, 36 pages.
Zone Rendering-Whitepaper, Document No. 298587-001, May 2002, pp. 1-15.
United Kingdom Intellectual Property Office Search Report and Examination Report dated Apr. 16, 2009 in Great Britain Application No. GB0900700.6, 4 pages.
United Kingdom Intellectual Property Office Search Report and Examination Report dated May 11, 2010 in Great Britain Application No. GB1000710.2, 6 pages.
First Office Action dated Sep. 23, 2011 in CN200710306692.2.
CN English translation of Second Office Action dated Jan. 4, 2012 in Chinese Patent Application CN 200610130945.0.
CN English translation of Third Office Action dated May 14, 2012 in Chinese Patent Application CN200610130945.0.
CN Decision and English translation dated Dec. 12, 2012 in Chinese Patent Application CN 200610130945.0.
JP Office Action and English translation of JP OA dated Aug. 21, 2012 in Japanese Patent Application JP 2007-314022.
JP Office Action and English translation of JP OA dated Oct. 18, 2013 in Japanese Patent Application JP 2010-005906.
Office action dated May 19, 2009 in U.S. Appl. No. 11/633,647.
Final Office Action dated Jan. 26, 2010 in U.S. Appl. No. 11/633,647.
Office Action dated Jul. 22, 2010 in U.S. Appl. No. 11/633,647.
Final Office Action dated May 24, 2011 in U.S. Appl. No. 11/633,647.
Examiner's Answer dated Mar. 16, 2012 in U.S. Appl. No. 11/633,647.
PTAB Decision mailed Jul. 16, 2015 in U.S. Appl. No. 11/633,647.
U.S. Appl. No. 11/987,265, filed Nov. 28, 2007.
Office Action dated Nov. 18, 2011 in U.S. Appl. No. 11/987,265.
Final Office Action dated Apr. 9, 2012 in U.S. Appl. No. 11/987,265.
Office Action dated Jan. 24, 2013 in U.S. Appl. No. 11/987,265.
Final Office Action dated Aug. 7, 2013 in U.S. Appl. No. 11/987,265.
Final Office Action dated Jun. 16, 2014 in U.S. Appl. No. 11/987,265.
Examiner's Answer dated Jun. 23, 2015 in U.S. Appl. No. 11/987,265.
Office Action dated Mar. 27, 2013 in U.S. Appl. No. 12/686,187.
GB Combined Search and Examination Report dated Oct. 24, 2018, GB Patent Application No. GB1807558.0.
Liu, "Lens Matched Shading and Unreal Engine 4 Integration Part 1," NVIDIA Corporation, GameWorks Blog, Jan. 18, 2017, available at: https://developer.nvidia.com/lens-matched-shading-and-unreal-engine-4-integration-part-1.
"VRWorks—Multi-Res Shading," NVIDIA Corporation, downloaded on May 1, 2018, available at: https://developer.nvidia.com/vrworks/graphics/multiresshading.
Saleh, et al., "QCOM Framebuffer Foveated," Qualcomm Technologies, Inc., May 10, 2017, available at: https://www.khronos.org/registry/OpenGL/extensions/QCOM/QCOM_framebuffer_foveated.txt.

* cited by examiner

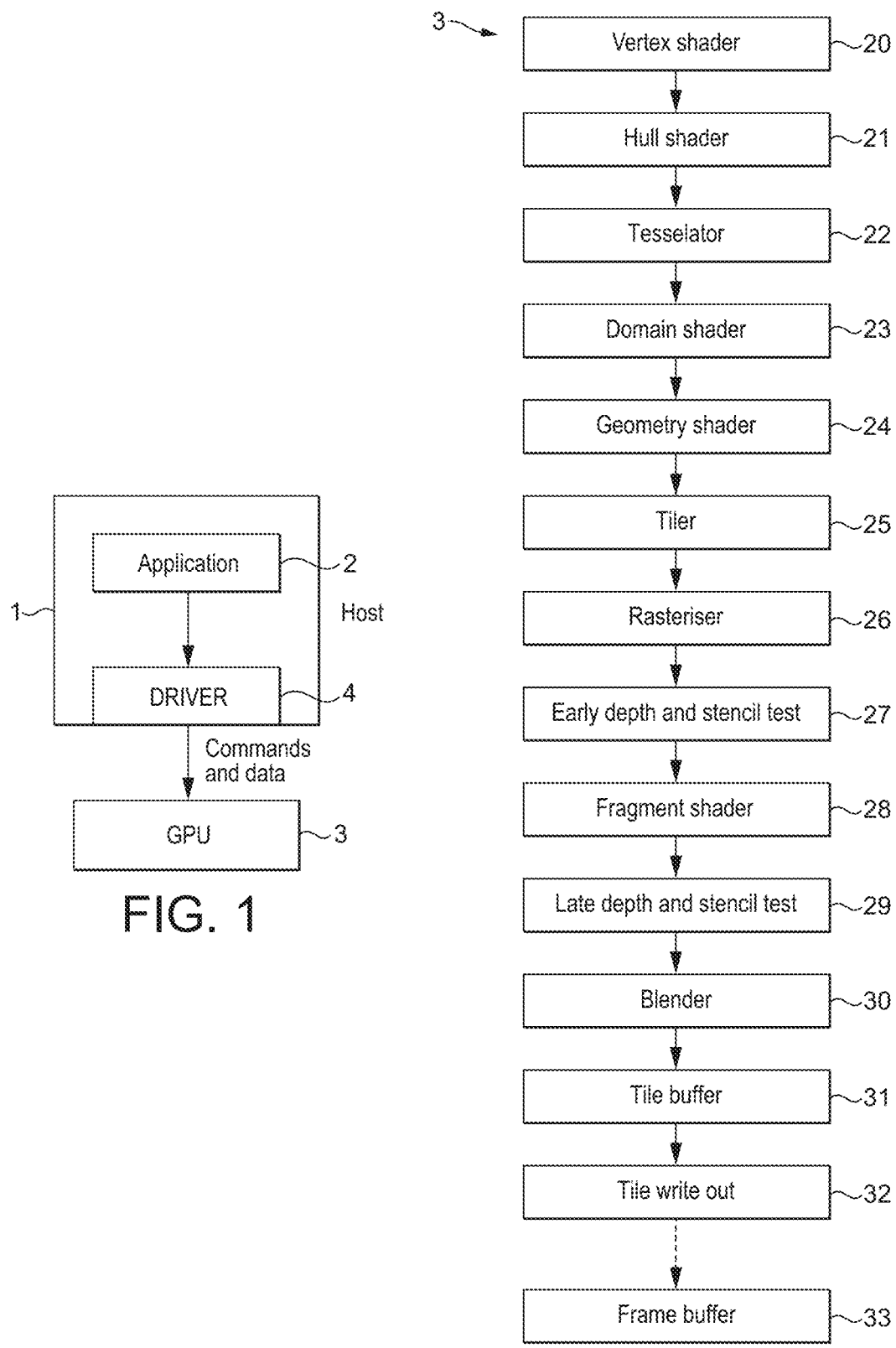

GRAPHICS PROCESSING SYSTEMS

BACKGROUND

The technology described herein relates to graphics processing, and in particular to the operation of a tile-based graphics processing system when performing foveated rendering.

Foveated rendering is a rendering technique where part of a frame (image) being displayed (the "foveal view") is rendered at a higher resolution for display, but other parts of the frame are rendered at a lower resolution. This is based on the fact that the part of the frame that the user is looking directly at may need to be rendered as a higher resolution for visual acceptability, while peripheral regions of the frame that the user is not directly looking at can be rendered at a lower resolution whilst still appearing visually acceptable. This can then be used to reduce the rendering burden on the graphics processing unit (GPU), by rendering more peripheral regions of the frame at a lower resolution, rather than rendering the entire frame being displayed at the highest required, "foveal" resolution.

Foveated rendering is typically carried out by identifying one or more "fixation points" where higher resolution versions of the frame will be rendered, with the regions further away from the fixation point or points being rendered with a lower resolution. Thus each fixation point indicates the highest resolution region of the frame, and, typically, is intended to correspond to the centre of the eye's retina, the fovea.

When performing foveated rendering, the location of the highest resolution region of the frame (the fixation point or points) may be determined in any suitable and desired manner. For example, some form of head tracking or eye tracking system may be used to try to identify where the user is looking at the image, so as to identify the regions of the frame that should be rendered with the highest resolution.

A particular use for foveated rendering is when rendering images for virtual reality displays (e.g. virtual reality head-mounted displays (VR HMDs)). High resolution head-mounted virtual reality displays typically use lenses that feature severe barrel distortion. The effect of this is that the rendered image towards the centre of the display (for each eye) is magnified whereas the peripheral areas are all compressed in size (minified). The effect of this then is that the peripheral regions can be rendered at a lower quality than the central, magnified region, without any significant loss in the overall visual effect for the user.

The Applicants believe that there remains scope for improvements to the operation of graphics processors and graphics processing systems when performing foveated rendering, in particular in the case of tile-based graphics processors and graphics processing systems.

BRIEF DESCRIPTION OF THE DRAWINGS

A number of embodiments of the technology described herein will now be described by way of example only and with reference to the accompanying drawings, in which:

FIG. 1 shows an exemplary computer graphics processing system;

FIG. 2 shows schematically a graphics processing pipeline that can be operated in the manner of the technology described herein;

Like reference numerals are used for like components where appropriate in the drawings.

DETAILED DESCRIPTION

Figure 3:
FIG. 3 illustrates foveated rendering.

A first embodiment of the technology described herein comprises a method of operating a tile-based graphics processor, the method comprising:

when the graphics processor is to render a set of plural images representing some or all of the same view of a scene but at different resolutions:

preparing lists of graphics geometry to be processed for respective sub-regions of the images to be rendered for the scene that is to be rendered at a first resolution; and rendering respective images representing the different resolution views of the scene, by rendering respective rendering tiles of each image using the lists of geometry to be processed for the image sub-regions that have been prepared for the scene to be rendered at the first resolution.

A second embodiment of the technology described herein comprises a tile-based graphics processor, comprising:

geometry list preparing circuitry for preparing lists of graphics geometry to be processed for respective sub-regions of an image to be rendered; and rendering circuitry for rendering tiles of images to be rendered using lists of geometry to be processed for image sub-regions prepared by the geometry list preparing circuitry;

wherein:

the geometry list preparing circuitry is further operable to, when the graphics processor is to render a set of plural images representing some or all of the same view of a scene but at different resolutions, prepare lists of graphics geometry to be processed for respective sub-regions of the images to be rendered for the scene that is to be rendered at a first resolution; and the rendering circuitry is further operable to, when the graphics processor is to render a set of plural images representing some or all of the same view of a scene but at different resolutions, render respective images representing the different resolution views of the scene, by rendering respective rendering tiles of each image using the lists of geometry to be processed for the image sub-regions that have been prepared for the scene to be rendered the scene to be rendered at the first resolution.

The technology described herein relates to the operation of tile-based graphics processors when rendering plural different resolution versions of the same view for display (i.e. when performing foveated rendering).

In tile-based rendering, the two-dimensional render output or target (i.e. the output of the rendering process, such as an output frame to be displayed) is rendered as a plurality of smaller area sub-regions, usually referred to as "tiles". The tiles are each rendered separately. The rendered tiles are then recombined to provide the complete rendering output (e.g. frame for display). In such arrangements, the render target (output) is typically divided (by area) into regularly-sized and shaped rendering tiles (they are usually e.g., squares or rectangles) but this is not essential.

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

The advantage of such tile-based rendering is that primitives that do not appear in a given tile do not have to be processed for that tile, and therefore can be ignored when the tile is processed. This allows the overall amount of graphics processing necessary for a given render output to be reduced.

In a tile-based rendering system, it is accordingly usually desirable to be able to identify and know the geometry to be processed (e.g. graphics primitives) that is actually present in a given rendering tile so as to, e.g., avoid unnecessarily rendering geometry (e.g. primitives) that is not actually present in a tile. In order to facilitate this, lists of geometry (e.g. primitives) to be rendered are prepared for respective sub-regions of the render output. Such "geometry-lists" ("primitive-lists") are then used to identify the geometry (e.g. primitives) to be rendered for the individual rendering tiles.

Thus, an important embodiment of tile-based graphics processing is to prepare suitable lists of geometry (e.g. primitives) for rendering for sub-regions that the image to be rendered is divided into.

In the technology described herein, such geometry (primitive) lists for sub-regions of the image are generated for the scene that is to be rendered at a given, first resolution, but then those geometry lists (e.g. lists of primitives) that were prepared at the first resolution are used when rendering each resolution version of the view that is required for the rendering process (and in particular will be used when rendering a version or versions of the view that have a different resolution to the first resolution that the geometry lists were prepared at, as well as for any view that has the same resolution as the first resolution that the geometry lists were prepared at).

The Applicants have recognised in this regard that it can be relatively straightforward to appropriately scale the geometry lists prepared at a given resolution for a scene to provide appropriate geometry lists for rendering other (and all the) resolution versions of the (same) view. This then avoids the need, e.g., to prepare multiple sets of geometry lists, one for each different resolution image that is to be generated, when performing foveated rendering, and can therefore reduce the processing burden on the graphics processor when performing foveated rendering.

The set of plural images corresponding to different resolution versions of the same view of the scene being rendered that are rendered can be any suitable set of images that can be used for foveated rendering (i.e. a set of images comprising views of the scene that are from the same viewpoint (views having (from) the same view position and having (in) the same view direction) but that have different resolutions).

There will be a highest resolution image of the view in the set of plural images, which will accordingly comprise the "foveal" view that is to be displayed at the fixation position where the highest resolution of the view is to be displayed.

There will then be one or more lower resolution versions of the view which may be, and are in an embodiment, used and displayed away from the fixation point, e.g. towards the periphery of the output frame that is being displayed.

There could be just two different resolution views, the highest resolution view and a lower resolution view. Alternatively, three or more different resolution images for a view could be prepared, comprising a highest resolution view and two or more lower resolution images of the view. In an embodiment, three different resolution images of the view are prepared, a highest resolution image, a "middle" resolution image, and a "lowest" resolution image.

The different resolution images are in an embodiment related to each other by a given, particular, and in an embodiment selected, scaling factor. Where there are more than two resolution images, then the images of each respective pair of "adjacent" resolution images may be (and in one embodiment are) related to each other by the same scale factor (i.e. a constant scale factor between the different resolution images is used). In some cases, such as virtual reality head-mounted displays, the lowest resolution view might be more spaced in resolution than the other views (i.e. such that some immediate level views may, e.g., in effect, be absent).

The scale factor is in an embodiment a power of two, although other arrangements could be used, if desired. In one embodiment, a higher resolution image is twice the resolution of its immediately preceding lower resolution image (in the resolution hierarchy), i.e. the resolution of each image is related to its neighbouring image or images in the resolution hierarchy by a factor of 2 (or by a factor of a half, accordingly).

The graphics geometry that is sorted into respective sub-regions of the images to be rendered and included in the lists of graphics geometry to be processed for the sub-regions of the images to be rendered can be any suitable and desired graphics geometry that can be defined for rendering a scene. In an embodiment, the graphics geometry comprises graphics primitives, such as, and in an embodiment, simple polygons, such as triangles, quads, lines and/or points.

Thus, in an embodiment, lists of graphics primitives to be processed for respective sub-regions of the image to be rendered are prepared for the highest resolution view of the scene that is to be rendered, and then the respective images representing the different resolution views of the scene are rendered by rendering respective rendering tiles of each image using the lists of graphics primitives to be processed for the image sub-regions that are prepared for the highest resolution view of the scene to be rendered (and the geometry lists preparing circuitry and rendering circuitry of the graphics processor is configured accordingly).

However, the geometry lists could include other graphics geometry that can be defined, as well as or instead of graphics primitives, if desired.

The rendering tiles that the render output (images) is divided into for rendering purposes in the technology described herein can be any suitable and desired such tiles. The size and shape of the rendering tiles may, e.g., and does in an embodiment, depend on the tile configuration that the graphics processor is configured to use and handle.

The rendering tiles are in an embodiment all the same size and shape (i.e. regularly-sized and shaped tiles are in an embodiment used), although this is not essential. The tiles are in an embodiment square or rectangular. The size and number of tiles can be selected as desired. In an arrangement, each tile is 16×16 or 32×32 sampling positions in size (with the render target (image being rendered) then being divided into however many such tiles as are required for the render output size and shape that is being used).

The sub-regions for which geometry (e.g. primitive) lists are prepared can be any suitable and desired sub-regions (areas) of the images that are being rendered.

In one embodiment, the image sub-regions for which geometry lists may be prepared all comprise an integer number of rendering tiles. For example, each sub-region could be sized such that it corresponds to a single rendering tile, or alternatively a sub-region could be sized such that It corresponds to (i.e. encompasses) more than one rendering tile. In one embodiment, each sub-region corresponds to a single rendering tile.

In another embodiment, however, the render target sub-regions may be sized such that they correspond to portions of rendering tiles. For example, the sub-regions may be sized such that they to correspond to (i.e. encompass) half a tile, or a quarter of a tile, or one and a half tiles, etc.

In one embodiment, the images are divided into a single set of sub-regions (only).

In another embodiment, geometry (e.g. primitive) lists may be prepared for at least two different sets of sub-regions. In this case, the sets of render target sub-regions for which primitive lists can be prepared are in an embodiment arranged such that the render target is effectively overlaid by plural layers of sets of sub-regions (with each layer being one set of sub-regions). Each layer should, and in an embodiment does, have different sized sub-regions for which primitive lists can be prepared to the other layers. The layers (sets of sub-regions) in an embodiment have progressively decreasing levels of resolution (i.e. their sub-regions encompass increasing numbers of rendering tiles).

These arrangements can allow, for example, the render target to be effectively covered by a hierarchy of plural different resolution layers of sub-regions, with each such "layer" being made up of a set of plural sub-regions in which each sub-region contains, e.g., and in an embodiment, the same number of rendering tiles, and the sub-regions in different "layers" containing different numbers of rendering tiles.

Such arrangements effectively allow geometry lists to be prepared for progressively decreasing levels of resolution (i.e. division into sub-areas) of the image (render target). This allows the resolution at which the geometry lists are prepared to be varied and controlled.

In an embodiment, the arrangement of the sub-regions for which geometry (e.g. primitive) lists are prepared is configured based on and, in an embodiment, in accordance with, the regions of the view (scene) that will be required at the highest resolution.

In an embodiment the image sub-region configuration (pattern) is arranged such that it is symmetric around the centre of the highest resolution region (the foveated region) of the scene that will be required (e.g., instead of simply starting at the top left corner of the scene (output frame)). For example, if the high resolution region is e.g. a*a sampling positions, then the image sub-region configuration could be, and is in an embodiment, set so that that region is exactly covered by a single a*a sampling position sub-region (with smaller sub-regions within that larger sub-region then being configured accordingly).

The identification of which of the geometry is to be processed for a given sub-region of the images being rendered (and thus to include in a geometry list for a given sub-region of the images) can be performed in any suitable and desired manner, e.g. using any suitable and known "tiling" (binning) technique. Thus, for example, exact binning and/or bounding box binding could be used for this process.

The "first" resolution at which the lists of graphics geometry (e.g. primitive lists) are prepared for the scene that is to be rendered can be any suitable and desired resolution. It is in an embodiment a resolution of one of the views of the scene that is to be rendered, but that is not essential.

In an embodiment, the first resolution is the resolution of the highest resolution view of the scene that will be required (i.e. of the "foveated" view). Thus, in an embodiment, the lists of graphics geometry to be processed for respective sub-regions of the images for the scene to be rendered are prepared at the resolution of the highest resolution view of the scene that is to be rendered.

Accordingly, in an embodiment, geometry (primitive) lists for sub-regions of the image are generated using and at the highest resolution that a view of the scene is to be rendered at (i.e. at the resolution of the highest resolution image in the set of plural images), but then those geometry lists (e.g. lists of primitives) are also used when rendering the lower resolution versions of the view (the lower resolution images) that are required for the, e.g. foveated, rendering process.

However, other arrangements, such as preparing the geometry lists at a lower resolution than the resolution of the highest resolution view of the scene that is to be rendered, could be used, if desired.

The lists of graphics geometry to be processed for respective sub-regions of the image to be rendered should be, and are in an embodiment, prepared for the entire scene to be rendered (i.e. so as to cover the maximum area that an image of the set of plural images to be rendered will (could) cover). In other words, the lists of graphics geometry to be processed for respective sub-regions of the image to be rendered are prepared as if the entire scene is being rendered at the resolution in question (e.g. at the highest resolution of the set of plural images).

Accordingly and correspondingly, in the case where, e.g., the highest resolution image may not actually be rendered for the whole scene (e.g. may have a smaller field of view), and the geometry lists are prepared at that highest resolution, then the lists of graphics geometry to be processed will still be prepared for the full extent of the scene, even if the actual field of view (the part of the scene) that is rendered at the highest resolution may not (and, typically, will not) comprise the entire scene (will comprise only a smaller part of the scene).

The geometry sorting (listing) process should, and in an embodiment does, operate on (use) appropriately transformed (vertex shaded) positions for the vertices of the geometry (e.g. primitives) that are to be rendered.

Accordingly, in an embodiment, before the geometry lists for the sub-regions of the images are generated, the set of geometry to be processed for the set of images is in an embodiment subjected to an appropriate vertex shading operation so as to provide an appropriate set of vertex shaded vertex positions for use then by the geometry sorting (listing) process. This vertex shading is in an embodiment performed at the resolution that the geometry sorting (tiling) process will be performed at, and the results of that vertex shading then used for preparing the sub-region geometry lists.

Again, in an embodiment, the vertex shading is performed at the resolution of the highest resolution image that is required. Again, the vertices are in an embodiment processed for all the scene at that highest resolution.

Thus, in an embodiment both the vertex position processing (shading) and the geometry list (primitive list) generation process are performed only once, at the first resolution (e.g. at the highest resolution that is required for an output image).

In an embodiment, the geometry list preparing operation is configured to take account of (based on) where lower and higher resolution images of the view being rendered will be required in the overall output frame (comprising the combination of the set of plural images).

Thus, in an embodiment, the geometry list preparation process takes account of the resolution of the image that will be required to be displayed in the sub-regions of the output frame, and is configured to prepare the geometry lists accordingly.

For example, and in an embodiment, the geometry list preparation operation could be configured to prepare geometry lists for larger sub-regions for those regions of the output frame where it is known that only a lower resolution image will be displayed. For example, the geometry list preparation operation could use 64×64 sampling position sub-regions at the edges of the output frame but use 16×16 sampling position sub-regions at and around the foveal point (fixation point) where the highest resolution image is to be displayed. Thus, in an embodiment, the size of the sub-regions that geometry lists are prepared for is selected (controlled and configured) based on the resolution of the image(s) that will be displayed in the image regions (areas) that the sub-regions relate to (cover).

Correspondingly, other operations, such as sample aware tiling (where any geometry, such as primitives that are so small as to be likely or certain to completely miss all sampling positions are identified and discarded) could be enabled and/or appropriately configured, to take account of the resolution that the sub-region in question is likely to be or will be displayed at.

Similarly, primitives, etc., could be more aggressively culled in the lower resolution image regions.

Correspondingly, where vertex positions are snapped to a predefined grid, the resolution of the grid that the vertex positions are snapped to could be configured differently for different image sub-regions, based on the resolution that the image will be displayed at for the sub-regions (in each respective sub-region).

This operation can be, and is in an embodiment, facilitated by providing to the geometry list preparation operation (the geometry list processing circuitry) appropriate information about the resolution that will be displayed for respective parts of the overall output frame that is being generated. This resolution information could be provided, e.g., as appropriate metadata and/or state information that is provided to the graphics processor as part of the metadata and/or state information for the graphics processing task in question (e.g. as state in a descriptor that is referenced by the tiler task (job), for example).

Once the lists of geometry (e.g. primitives) to be processed have been prepared for each image sub-region, the geometry lists are in an embodiment stored for use, e.g., and in an embodiment, to allow the rendering process to identify which geometry (e.g. primitives) need to be considered (i.e. rendered) for each respective rendering tile, when the images are being rendered.

Once the geometry lists for the sub-regions have been prepared at the first resolution (e.g. at the highest resolution that will be required for an output image in the set of images), the so-prepared geometry lists should be, and are in an embodiment, then used to render the set of plural images showing the view at the respective different resolutions.

To do this, the graphics processor will use the geometry lists for the sub-regions to render tiles for each appropriate level of resolution image that is required. (It should be noted in this regard that the rendering of the images will be performed on a per-rendering tile basis (i.e. for respective rendering tiles that the output image has been divided into for rendering purposes), even though the sub-regions that are used when preparing the lists of geometry to be processed, may not correspond exactly to individual rendering tiles).

To render a given tile of an image, the graphics processor will determine (identify) from the geometry lists for the sub-region or regions that include (at least in part) the rendering tile in question the geometry (e.g. primitives) to be processed for that rendering tile, and then process that geometry accordingly (e.g., and in an embodiment, by rasterising the geometry (e.g. primitives) to graphics fragments and then rendering the graphics fragments to provide output rendered graphics fragment data for the tile).

Thus, rendering respective rendering tiles of each image using the lists of geometry to be processed for the image sub-regions that have been prepared for the scene to be rendered at the first (e.g. highest) resolution should, and in an embodiment does, comprise using the lists of geometry to be processed for the image sub-regions that have been prepared for the scene to be rendered at the first (e.g. highest) resolution to determine (identify) the geometry to be processed for respective rendering tiles of the image that is being rendered (and of each image that is to be rendered).

Thus, the technology described herein in an embodiment comprises using the prepared geometry lists to render one or more primitives so as to generate a set of output values representing an image that represents the view of the scene at one of the resolutions that is required. This is in an embodiment done for each (different) view that is required.

The rendering process can be performed in any desired and suitable manner, e.g. depending upon the nature of the graphics processor in question.

In an embodiment, the step of rendering respective images representing the different resolutions of the scene in an embodiment comprises identifying from the geometry list prepared at the first (e.g. highest) resolution for a rendering tile, the geometry (e.g. primitives) to be processed for the rendering tile, performing any geometry setup operations (e.g. primitive setup operations) necessary for processing the identified geometry, rasterising the identified geometry to graphics fragments for rendering, and then rendering (shading) the graphics fragments to provide output rendered graphics fragment data for the geometry for the tile. The rendering process can, and in an embodiment does, also include any other processing that the graphics processor or the graphics processing pipeline may perform when rendering geometry for output (e.g. for display), such as performing hidden surface removal operations, depth testing, stencil testing, blending, texture mapping, etc.

Correspondingly, the rendering circuitry of the graphics processor is in an embodiment operable to, and in an embodiment comprises processing circuitry configured to, identify from the geometry list prepared at the first (e.g. highest) resolution for a rendering tile, the geometry (e.g. primitives) to be processed for the rendering tile, perform any geometry setup operations (e.g. primitive setup operations) necessary for processing the identified geometry, rasterise the identified geometry to graphics fragments for rendering, and then render (shade) the graphics fragments to provide output rendered graphics fragment data for the geometry for the tile. Again, the rendering circuitry of the graphics processor is in an embodiment operable to, and in an embodiment comprises processing circuitry configured to, perform other processing that a graphics processor or the graphics processing pipeline may perform when rendering geometry for output (e.g. for display), such as performing hidden surface removal operations, depth testing, stencil testing, blending, texture mapping, etc.

The rendering process may involve using only a single sub-region geometry list to determine the geometry to be processed for a tile, or, where a tile is included, at least in part, in two or more sub-region geometry lists, using plural sub-region geometry lists to determine the geometry that needs to be processed for a tile.

When rendering an image that has the resolution that the geometry lists were prepared for (e.g. the highest (full) resolution image) using the prepared geometry lists, that can be, and is in an embodiment, done simply using the prepared geometry lists as they are (since the geometry lists already represent the geometry at the resolution that is to be generated).

The prepared first (e.g. "highest" ("full")) resolution geometry lists can be used when rendering other (e.g. lower) resolution images of the set of plural images of the view in question in any suitable and desired manner.

In an embodiment, the geometry to be processed for a differing resolution image is derived from the "first" resolution geometry list(s) by scaling the geometry in the "first" resolution geometry list by the appropriate scaling factor that relates the resolution of the image being rendered to the "first" resolution that the geometry lists were prepared at) (e.g., and in an embodiment, by an appropriate power of two scaling factor, such as by a factor of 2). Such scaling is in an embodiment done as part of the vertex position loading operation, but other arrangements would be possible, if desired.

Thus, in the case where an image having a lower resolution than the first resolution that the geometry lists were prepared at is to be rendered, in an embodiment, the geometry to be processed for the lower resolution image is derived from the "first" resolution geometry list(s) by scaling down the geometry in the "first" resolution geometry lists, in an embodiment by scaling down the geometry in the "first" resolution geometry lists by the appropriate scaling factor that relates the resolution of the image being rendered to the "first" resolution that the geometry lists were prepared at (e.g., and in an embodiment, by an appropriate power of two scaling factor, such as by a factor of 2).

Correspondingly, in the case where an image having a higher resolution than the first resolution that the geometry lists were prepared at is to be rendered, in an embodiment, the geometry to be processed for the higher resolution image is derived from the "first" resolution geometry list(s) by scaling up the geometry in the "first" resolution geometry lists, in an embodiment by scaling up the geometry in the "first" resolution geometry lists by the appropriate scaling factor that relates the resolution of the image being rendered to the "first" resolution that the geometry lists were prepared at (e.g., and in an embodiment, by an appropriate power of two scaling factor, such as by a factor of 2).

While it would be possible simply to generate each different resolution image for all the processing tiles of the output frame (i.e. in its entirety) (and in one embodiment that is what is done), in an embodiment, the different resolution images are in an embodiment generated only for given, particular, and in an embodiment, selected rendering tiles of the overall output frame. In other words, the rendering of the respective images representing the different resolution views of the scene in an embodiment comprises rendering for at least one of those respective images some but not all of the complete view of the scene. In an embodiment for each image of the set of plural images being rendered, only some but not all of that image is rendered.

For example, and in an embodiment, the highest resolution image is in an embodiment at least (and in an embodiment only) generated for rendered tiles for the part of the output frame where that highest (full) resolution image may need to be displayed (i.e. for rendering tiles that are centred around the fixation point or points, e.g. at the centre of the output frame). Thus, the highest resolution image is in an embodiment generated for only some but not all of the (overall) output frame to be displayed.

Correspondingly, the lower resolution image or images are in an embodiment generated at least for those rendering tiles that are further from the fixation point or points (e.g. from the centre of the screen), but may not be, and in an embodiment aren't, generated for those rendering tiles that are at or near the fixation point or points (e.g. that are at or near the centre of the output frame).

The Applicants have recognised in this regard, that for those regions of the output frame where the highest (full) resolution image (i.e. the foveal view) is to be used, the lower resolution images may never be displayed in those tiles. Thus, in an embodiment, the lower resolution images are not generated for tiles where it is known that they will not be used (i.e. in practice for the tiles at or near the fixation point or points).

Such a region or regions of tiles that do not need to be rendered in the lower resolution image(s) can be identified as desired, e.g. from information relating to the fixation point or points for the foveated rendering and/or the scaling factor between the highest resolution image and the lower resolution images.

Thus, in an embodiment, the highest resolution image is rendered for a region comprising some but not all of the rendering tiles of the overall output frame, and the lower resolution image or images are not rendered for at least some of the rendering tiles that the highest resolution image has been rendered for. Correspondingly, in an embodiment, the highest resolution image is not rendered for at least some of the rendering tiles that a lower resolution image or images has been rendered for.

Similarly, in an embodiment, only the central part of the full resolution image is rendered (i.e. rendering tiles at the edge of the full resolution image are not rendered). Correspondingly, in an embodiment, for a, and in an embodiment for each, lower resolution image, one or more rendering tiles at the centre of the image are not rendered (but the rendering tiles at the edge of the image are in an embodiment rendered).

In an embodiment, any rendering tiles in an image that do not need to be rendered are indicated to the rendering process, so as to allow the rendering process to avoid (to omit) the rendering of those tiles for the image(s) in question.

This information can be indicated to the rendering process in any suitable and desired manner. For example, the driver for the graphics processor could configure the rendering tasks so as to exclude the tiles that are not to be rendered in an image (e.g. in the lower resolution images). For example, the rendering process for an image could be divided into plural rendering tasks, which exclude the unnecessary tiles. Where the driver, e.g., provides a list of tiles to be rendered for a rendering task, then the driver could be configured simply to omit the tiles that are to be omitted from the rendering process for an image(s). It would also or instead be possible to indicate, e.g., a "render exclude region" which identifies an area (e.g. a rectangle) within which tiles should not be rendered for an image.

In an embodiment, each rendering tile of the output frame has associated with it an indication of which resolution image or images (which level(s) of detail) should be produced for that tile location. This information may be, and in an embodiment is, provided together with the geometry lists for the sub-regions. Other arrangements would, of course, be possible.

Then, for each rendering tile (and each tile location), the corresponding indicated resolution images (level(s) of detail) are generated.

Other arrangements to cause the rendering process to omit the rendering of selected tiles within the different resolution images could, of course, be used, if desired.

It will be appreciated that in the above embodiments, for a given output frame, some of the tiles of the output frame will be rendered at only a single resolution (level of detail) whereas other tiles of the output frame may be rendered at two (or more) levels of resolution (levels of detail), e.g., and in an embodiment, depending upon where the tiles fall in relation to the fixation point or points for the foveated image that is to be rendered.

For example, when rendering a 4k*4k output image with three levels of detail and assuming that the fixation point (the foveal view) is in the centre of the scene, in an embodiment, the rendering process will operate to generate: one 1k*1k full resolution image for the centre of the output frame (around the fixation point), covering 1k*1k sampling positions; one 1k*1k half resolution image, covering 2k*2k sampling positions (potentially, and in an embodiment, also with holes in the centre (around the fixation point) where the full resolution image only will be displayed (as discussed above)); and one 1k*1k quarter-resolution image, covering 4k*4k sampling positions (again possibly, and in an embodiment, with holes in the centre of the output frame (around the fixation point) where the full resolution and/or half-resolution image only will be displayed).

Each different resolution image is in an embodiment generated as a separate output surface, with the different resolution images then being appropriately combined to provide the final ("foveated") output frame that is then displayed.

The process of combining the different resolution images to provide the final output surface will be discussed in more detail below.

Thus in an embodiment, each image in a set of plural images being rendered is generated as a separate image and stored, e.g., and in an embodiment, as a respective output frame (frame buffer), e.g., and in an embodiment, in main memory of the overall data processing system that the graphics processor is part of. Once each different resolution image has been rendered, the different resolution images are in an embodiment then combined appropriately to provide the overall, "foveated" output image that is to be displayed.

While it would be possible in this regard to generate each different resolution image separately, one after another, in an embodiment, the rendering of the tiles for the different resolution images is interleaved. For example, where for a given tile, two different resolution images are to be generated, in an embodiment, the tile is generated at the, e.g., first resolution, and then generated at the, e.g., second resolution, before moving on to generating the next tile (which may then again, e.g., be generated at the first resolution, followed by the second resolution), and so on. This can help to improve the rendering efficiency, as it may avoid, e.g., the need to repeatedly reload the same geometry lists for a tile.

As well as scaling (if necessary) the geometry in the geometry lists appropriately depending upon the resolution of the image that is being rendered, in an embodiment, the rendering of the different resolution images of the view is in an embodiment configured (varied) according to (based on) the resolution (the level of detail) of the image that is being rendered.

Thus, in an embodiment, one or more rendering parameters for the rendering process are set based on the resolution of the image that is being rendered.

For example, and in an embodiment, the level of anti-aliasing (e.g., and in an embodiment, the multisampling count) can be, and is in an embodiment, selected (set), based on the resolution level (the level of detail) that is being rendered. Correspondingly, the fragment shading frequency can be, and is in an embodiment, varied depending upon the resolution level that is being rendered. Additionally or alternatively, per sample shading could be enabled or disabled, depending upon the level of resolution of the view that is being rendered.

Thus, in an embodiment, the rendering process for the different resolution images of the view uses different multisample counts and/or fragment shading frequency between the highest (full) resolution foveal view image and the lower resolution, non-foveal view images.

This can then allow the higher and lower resolution images being rendered to be rendered with different (and appropriate) quality, whilst further reducing the processing burden on the graphics processor where it is possible and appropriate to do that.

As discussed above, in an embodiment at least the operation of the technology described herein will produce a set of plural images of the same view, with each image representing some or all of the view at a given resolution. To provide the overall output frame that will be displayed, the plural different resolution images should then be, and are in an embodiment, appropriately combined (composited) to provide the final overall output image. Such combining of the different images should, and in an embodiment does, comprise displaying the highest resolution view at the foveal fixation point or points, but displaying the lower resolution image or images away from the fixation point or points (e.g. towards the periphery of the output frame).

The selection of which resolution image is to be displayed for any given position in the overall output frame can be performed and indicated as desired, e.g., and in an embodiment, in the manner that is used for the graphics processor and the graphics processing system in question when performing foveated rendering.

For example, appropriate head tracking or eye tracking information could be used to identify which resolution image should be displayed where in the output frame, and/or, in the case of virtual reality head-mounted displays, the centre of the output frame could be identified and indicated as the region where the highest resolution image should be displayed, with regions towards the periphery of the output image then being displayed at lower resolutions.

It would be possible in this regard simply to select one of the images (e.g. the highest resolution image or a lower resolution image) to display at any given position (e.g. tile location) in the output frame that is displayed. However, in an embodiment, the various different images are appropriately combined to provide the overall output image. In an embodiment this is done by appropriate interpolation (filtering) of different resolution images in the regions of the output frame where there is a transition from one resolution image to another resolution image.

In an embodiment filtering circuitry (hardware) of the graphics processor is used to sample and combine the different resolution images to provide the output frame that is displayed.

In an embodiment, bilinear filtering is used to sample within a single resolution image, and tri-linear filtering is used to sample and filter between two different resolution images when that is required.

The appropriate combining of the different resolution images to provide the output frame can be performed in any suitable and desired manner. In an embodiment, this is done using texture mapping circuitry of the graphics processor, and in an embodiment using the texture mapping interpolation circuitry of the graphics processor.

Thus, in an embodiment, the different resolution images in the set of plural images that are rendered are treated as respective texture maps to be input to the graphics processor, and the graphics processor then performs a rendering pass where it uses those texture maps to provide the overall final, "foveated", output image, e.g. to be displayed.

In an embodiment, the different resolution images are treated as if they are each a respective mipmap level of a set of mipmaps (as a texture mipmap), and then the output frame is generated by sampling appropriately from the set of mipmaps, e.g., and in an embodiment, by using an appropriate filtering process.

To facilitate this operation, the level of detail that is set and used when sampling the mipmap texture is in an embodiment varied depending upon the location within the overall output frame that is being sampled (e.g., and in an embodiment, based on the position in the output frame relative to a fixation point for the foveated image).

In an embodiment, the level of detail selection that is used to sample the mipmap containing the different resolution images is selected (set) dependent on the location in the output frame so as to ensure that there is actual (defined, rendered) data available for the position in question at the resolution level that is being sampled.

In an embodiment, the sampling level of detail used when sampling the mipmap containing the different resolution images of the view is configured and set such that the most detailed resolution image (mipmap level) with defined content (i.e. rendered data) for a given position in the output frame will always be sampled for that position (and/or (and in an embodiment and) such that the sampling operates to transition "smoothly" from one mipmap level (level of resolution) to another).

In an embodiment, the level of detail that is used is set so as to sample the highest resolution image (mipmap level) for positions at or near the fixation point, but for positions within the output frame that are further from a fixation point, the level of detail is in an embodiment biased so as to preferentially select from the lower resolution images, and/or (and in an embodiment and) so as to cause a smoother transition to the lower resolution images around the edge of the higher resolution image.

In an embodiment, the different resolution images are arranged as a mipmap texture such that each mipmap level has the same physical dimensions, but is and will be interpreted as if that physically stored data is the data for the centre of a larger "virtual" level. The level of detail when sampling the mipmap will then be set accordingly to ensure that "true" (defined (rendered)) data is always sampled for a given position in the output frame.

In an embodiment, each different resolution image is configured to have the same physical size (i.e. to occupy the same number of sampling positions), but depending upon its resolution, the data is then considered to be the centre of a larger virtual mipmap level, with the size of the larger virtual level being dependent upon the resolution of the image in question.

For example, for a 4k*4k output frame with three levels of resolution (detail) each having a scaling factor of 2 between them, in this arrangement, the highest mipmap level, level 0, is in an embodiment stored as a 1k*1k texture that contains the centre of the view at the highest resolution, but is treated as a 4k*4k level of which the actually stored 1k*1k part is the centre (with the rest of the level being ignored). Correspondingly, the next lower mipmap level, level 1, is again in an embodiment stored as a 1k*1k texture, but which contains the centre of the output frame at half resolution (and that will correspondingly be treated as 2k*2k level of which the actually present 1k*1k data is in the centre, with the result of the level being ignored). The third mipmap level, level 2, is again in an embodiment stored as a 1k*1k texture, but which contains the centre of the scene at a quarter resolution and is treated as a full 1k*1k level.

In these arrangements, the mipmap texture levels greater than 2 could be left undefined and not used, or could be used to store further lower resolution versions of the view, e.g. as a regular texture.

Although the technology described herein has been described above with particular reference to the generation of different resolution images representing a given view of a scene to be displayed, as will be appreciated by those skilled in the art, this process is in an embodiment repeated for plural views to be displayed, e.g., and in an embodiment, for a sequence of successive output frames that are to be displayed using foveated rendering.

Correspondingly, where the images being displayed are for virtual reality displays (and thus comprise rendering plural different views of a scene from plural different viewpoints, such as a "left eye" view, and a "right eye" view for stereoscopic rendering (in which two images of a scene, one corresponding to the scene as seen from the left eye, and one corresponding to the scene as seen from the right eye, are generated, and then displayed appropriately so as to provide a three-dimensional effect when the images are viewed), each different view to be rendered, e.g., and in an embodiment both the left and right eye images, is in an embodiment rendered using foveated rendering in the manner of the technology described herein.

As will be appreciated from the above, the technology described herein relates to the operation of the graphics processor when performing foveated rendering. Thus, in an embodiment, it is first recognised that the graphics processor is to perform foveated rendering (is to render a set of plural images representing some or all of the same view of a scene with different resolutions), and then the operation in the manner of the technology described herein is triggered accordingly.

It can be recognised (determined) when the graphics processor is to perform foveated rendering (is to render a set of plural images representing some or all of the same view of a scene but at different resolutions) in any suitable and desired manner.

In an embodiment, this may be, and in an embodiment is, determined from information, such as state information and/or metadata, associated with the graphics processing task or tasks that is to be executed by the graphics processor, e.g., and in an embodiment, that are being provided by an application that requires graphics processing, e.g., and in an embodiment, that indicates that foveated rendering is required. For example, an application that requires graphics processing by the graphics processor may provide an indication, when it requests the graphics processing operations, that foveated rendering is being performed.

In an embodiment, the fact that foveated rendering to render a set of plural images representing some or all of the same view of the scene but at different resolutions is to be performed is indicated by means of a function call that an application requiring the graphics rendering can be used to indicate that such rendering is required. For example, in the case of the OpenGL API, this could be recognised through the use of an appropriate function call, e.g. that is similar to the OVR_multiview function call that is used to indicate multiview rendering, e.g. as an extension of OpenGL/Open GL ES. The use of this function call (e.g. API extension) could be recognised, e.g., and in an embodiment, by the driver for the graphics processor, to indicate that foveated rendering is required (with the driver then triggering the graphics processor to perform the rendering of the set of plural images representing some or all of the same view of the scene but at different resolutions in the manner of the technology described herein). Corresponding arrangements could be used for other graphics APIs (Application Programming Interfaces).

In an embodiment an application can indicate, e.g. via a function call, that the geometry is to be rendered to multiple views (surfaces), together with the desired scale factor associated with the different resolution views. The application, e.g., function call, may also be able to and in an embodiment can also, indicate per-view geometry listing and/or rendering parameters, such as multi-sample/per-sample shading configurations, and/or which tiles should be rendered at which resolutions.

Other arrangements would, of course, be possible. For example, it could be recognised that the graphics processing tasks in question will produce multiple frame buffers and/or that a shader program to be executed uses a particular variable or variables.

When it is recognised that the graphics processor is to render a set of plural images each representing some or all of the same view of the scene but at different resolutions, the operation of the graphics processor in the manner of the technology described herein can be triggered in any suitable and desired manner (the graphics processor can be configured to operate in the manner of the technology described herein in any suitable and desired manner).

In an embodiment, the driver for the graphics processor indicates to the graphics processor (issues commands to the graphics processor) to render a set of plural images in the manner of the technology described herein with the appropriate scale factor between the different resolution images.

Correspondingly, any shading programs, such as vertex shading and/or fragment shading programs to be executed by the graphics processor when rendering the set of images are in an embodiment configured appropriately. This is in an embodiment done by the compiler for the graphics processor (for any shaders of the graphics processor) (by compiler processing circuitry for the graphics processing system).

(The compiler may, e.g., execute on the host processor of the graphics processing system (and in an embodiment does execute on the host processor of the graphics processing system), e.g., and in an embodiment, that the application that is requesting the graphics processing executes on, e.g., and in an embodiment, as part of a driver for the graphics processing pipeline that executes on the host processor. Other arrangements would be possible, if desired.)

It will be appreciated from the above, that in the technology described herein the geometry list preparing operation is performed once for the set of images that are being rendered, but the other operations for rendering the views, such as the rasterising and rendering (fragment shading) operations, still should be, and are in an embodiment, performed separately for each view (by using, appropriately, the geometry list prepared from the single geometry list preparing task that has been performed).

Thus, in an embodiment, where a set of N images are to be rendered, a single geometry list preparing (tiling) task is in an embodiment defined and executed (to be used for all the views), but N rendering (fragment shading) jobs (tasks) are in an embodiment defined and executed (one for each view). The geometry list preparing task will produce the geometry lists at the first resolution. Each rendering task will produce the rendered output (image) for one of the views. The driver for the graphics processor in an embodiment configures the tasks (jobs) for the graphics processor in this manner.

Each rendering task in an embodiment also indicates the resolution the prepared geometry lists should be rasterised at for that rendering task. As discussed above, the rendering tasks can, and in an embodiment do, also indicate for which rendering tiles the image in question should be rendered.

In an embodiment the driver for the graphics processor (e.g. that is executing on the host processor of the overall graphics processing system) sets such tasks for the graphics processor when foveated rendering is required.

Other arrangements would, of course, be possible.

As will be appreciated from the above, the graphics processor is in an embodiment part of an overall graphics processing system that includes a host processor that executes applications that can require graphics processing by the graphics processor.

The host processor will send appropriate commands and data to the graphics processor to control it to perform graphics processing operations and to produce graphics processing (render) output required by applications executing on the host processor (including in the manner of the technology described herein).

To facilitate this, the host processor should, and in an embodiment does, also execute a driver for the graphics processor and a compiler or compilers for compiling shader programs to be executed by programmable shading stages of the graphics processor (which compiler may be, and in an embodiment is, a part of the driver).

Thus in an embodiment, the graphics processor is in communication with a host microprocessor (that is part of the overall graphics processing system) that executes a driver for the graphics processor and/or a compiler or compilers for the graphics processor. The graphics processor and/or host microprocessor are in an embodiment also in communication with a display for displaying the images generated by the graphics processor (thus in an embodiment the graphics processing system further comprises a display for displaying the images generated by the graphics processor).

Thus, an embodiment of the technology described herein comprises a graphics processing system comprising:
a host processor; and
a tile-based graphics processor;
the graphics processor comprising:
geometry list preparing circuitry for preparing lists of graphics geometry to be processed for respective sub-regions of an image to be rendered; and
rendering circuitry for rendering tiles of images to be rendered using lists of geometry to be processed for image sub-regions prepared by the geometry list preparing circuitry; the graphics processing system (and in an embodiment the host processor) further comprising:
processing circuitry configured to:
recognise when the graphics processor is to render a set of plural images representing some or all of the same view of a scene but at different resolutions; and to,
when it is recognised that the graphics processor is to render a set of plural images representing some or all of the same view of a scene but at different resolutions:
cause the geometry list preparing circuitry of the graphics processor to prepare lists of graphics geometry to be processed for respective sub-regions of the images to be rendered for the scene that is to be rendered at a first resolution; and
cause the rendering circuitry of the graphics processor to render respective images representing the different resolutions of the scene by rendering respective rendering tiles of each image using the lists of geometry to be processed for the image sub-regions that have been prepared for the scene to be rendered at the first resolution.

A further embodiment of the technology described herein comprises a method of operating a graphics processing system, the graphics processing system comprising:
a host processor; and
a tile-based graphics processor;
the graphics processor comprising:
geometry list preparing circuitry for preparing lists of graphics geometry to be processed for respective sub-regions of an image to be rendered; and
rendering circuitry for rendering tiles of images to be rendered using lists of geometry to be processed for image sub-regions prepared by the geometry list preparing circuitry;
the method comprising:
the host processor of the graphics processing system:
recognising that an application executing on the host processor requires the graphics processor to render a set of plural images representing some or all of the same view of a scene but at different resolutions; and,
when it is recognised that the graphics processor is to render a set of plural images representing some or all of the same view of a scene but at different resolutions, instructing the graphics processor to:
prepare lists of graphics geometry to be processed for respective sub-regions of the images to be rendered for the scene that is to be rendered at a first resolution; and to
render respective images representing the different resolutions of the scene by rendering respective rendering tiles of each image using the lists of geometry to be processed for the image sub-regions that have been prepared for the scene to be rendered at the first resolution; and
the graphics processor, in response to being instructed by the host processor:

preparing, by the geometry list preparing circuitry of the graphics processor, lists of graphic geometry to be processed for respective sub-regions of the images to be rendered for the scene that is to be rendered at the first resolution; and
rendering, by the rendering circuitry of the graphics processor, respective images representing the different resolution views of the scene by rendering respective rendering tiles of each image using the lists of geometry to be processed for the image sub-regions that have been prepared for the scene to be rendered at the first resolution.

As will be appreciated by those skilled in the art, these embodiments of the technology described herein can, and in an embodiment do, include any one or more or all of the optional features of the technology described herein described herein, as appropriate. Thus, for example, it is in an embodiment a driver on the host processor that identifies when foveated rendering is required by an application executing on the host processor (in an embodiment in one of the ways discussed above), and that then causes ("instructs") the graphics processor to operate accordingly.

Similarly, the graphics processing system in an embodiment has and/or is in communication with a display for displaying images generated by the graphics processor, and/or has or is in communication with a memory in which images generated by the graphics processor may be stored, e.g. for subsequent processing, e.g. display. Similarly, there is in an embodiment an application on the host processor that indicates a requirement for performing foveated rendering, which requirement is then recognised by, e.g., a driver executing on, the host processor, with the, e.g. driver on, the host processor then operating to instruct the graphics processor to render the plural images for the foveated rendering accordingly.

As well as the elements and stages described above, the graphics processor can otherwise include, and in an embodiment does include, any one or more, and in an embodiment all, of the other processing stages that a graphics processor can normally include. Thus, for example, the graphics processor in an embodiment includes a primitive setup stage, a rasteriser and a renderer. In an embodiment the renderer is in the form of or includes a programmable fragment shader.

The graphics processor in an embodiment also comprises a tile buffer for storing tile sample values and/or a write out unit that operates to write the data in the tile buffer (e.g. once the data in the tile buffer is complete) out to external (main) memory (e.g. to a frame buffer).

The graphics processor in an embodiment comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor may also contain any other suitable and desired processing stages that a graphics processor may contain such as a depth (or depth and stencil) tester(s), a blender, a write out unit etc.

Any programmable, shading stages of the graphics processing pipeline such as the vertex shader, fragment shader, etc., can be implemented as desired and in any suitable manner, and can perform any desired and suitable shading, e.g. vertex shading, fragment shading, etc., functions, respectively and as appropriate.

Each programmable processing stage (shader) may comprise any suitable programmable hardware element such as programmable processing circuitry. Each programmable processing stage (shader) may be provided as a separate circuit element to other programmable stages (shaders) of the processing pipeline or the programmable processing stages may share some or all of their programmable processing circuitry (that is then differently programmed to serve as the desired programmable processing stage (shader)).

In an embodiment, the graphics processor comprises, and/or is in communication with, one or more memories and/or memory devices that store the data described herein, and/or that store software for performing the processes described herein.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In some embodiments, the technology described herein is implemented in computer and/or micro-processor based system.

The technology described herein is in an embodiment implemented in a portable device, such as, and in an embodiment, a mobile phone or tablet.

It is believed that the technology described herein would be particularly applicable to devices where foveated rendering will be required, such as for virtual reality display devices such as virtual reality headsets.

The technology described herein should (and in an embodiment does) produce some useful output data, e.g. rendered image data for display of an image.

Another embodiment of the technology described herein comprises a virtual reality display device comprising the graphics processor or system of any one or more of the embodiments and embodiments of the technology described herein. Correspondingly, another embodiment of the technology described herein comprises a method of operating a virtual reality display device, comprising operating the virtual reality display device in the manner of any one or more of the embodiments of the technology described herein.

The various functions of the technology described herein can be carried out in any desired and suitable manner. For example, the functions of the technology described herein can be implemented in hardware or software, as desired. Thus, for example, the various functional elements and stages of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that embodiments of the technology described herein comprise computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processor (graphics processing unit (GPU)) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processor 3 of the present embodiment in more detail.

The graphics processor 3 shown in FIG. 2 is a tile-based renderer and will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions (areas), usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a set of geometry, typically a series of primitives (polygons), which geometry (e.g. primitives) is then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processor 3 that are relevant to the operation of the present embodiment. As will be appreciated by those skilled in the art there may be other elements and stages of the graphics processor (graphics processing pipeline) that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline that the graphics processor 3 executes includes a number of stages, including vertex shader 20, a hull shader 21, a tesselator 22, a domain shader 23, a geometry shader 24, a tiler 25, a rasterisation stage 26, an early Z (depth) and stencil test stage 27, a renderer in the form of a fragment shading stage 28, a late Z (depth) and stencil test stage 29, a blending stage 30, a tile buffer 31 and a downsampling and writeout (multisample resolve) stage 32.

The vertex shader 20 takes the input data values associated with the vertices, etc., defined for the output to be generated, and processes those data values to generate a set of corresponding "vertex shaded" output data values for use by subsequent stages of the graphics processing pipeline 3.

Each primitive to be processed is usually defined by and represented as a set of vertices. Each vertex for a primitive typically has associated with it a set of "attributes", i.e. a set of data values for the vertex. These attributes will typically include position data and other, non-position data (varyings), e.g. defining colour, light, normal, texture coordinates, etc, for the vertex in question.

For a given output to be generated by the graphics processor, there will typically be a set of vertices defined for the output in question. The primitives to be processed for the output will then be indicated as comprising given vertices in the set of vertices for the graphics processing output being generated.

The vertex shading operation operates to transform the attributes for each vertex into a desired form for the subsequent graphics processing operations. This may comprise, for example, transforming vertex position attributes from the world or user space that they are initially defined for to the screen space that the output of the graphics processing system is to be displayed in, modifying the input data to take account of the effect of lighting in the image to be rendered, etc.

The hull shader 21 performs operations on sets of patch control points and generates additional data known as patch constants. The tessellation stage 22 subdivides geometry to create higher-order representations of the hull, and the domain shader 23 performs operations on vertices output by the tessellation stage (similar to a vertex shader). The geometry shader 24 processes entire primitives such as a triangles, points or lines.

These stages together with the vertex shader 20 effectively perform all the necessary fragment frontend operations, such as transformation and lighting operations, and primitive setup, to setup the primitives to be rendered, in response to commands and vertex data provided to the graphics processor 3.

Once all the primitives to be rendered have been appropriately set up, the tiler 25 then determines which primitives need to be processed for each tile that the render output has been divided into for processing purposes. To do this, the tiler 25 compares the location of each primitive to be processed with the tile positions, and adds the primitive to a respective primitive list for each tile that it determines the primitive could (potentially) fall within. Any suitable and desired technique for sorting and binning primitives into tile lists, such as exact binning, or bounding box binning or anything in between, can be used for the tiling process.

Once lists of primitives to be rendered (primitive-lists) have been prepared for each rendering tile in this way, the primitive-lists are stored for use, e.g., to allow the system to identify which primitives need to be considered (and rendered) when the tile in question is rendered.

Once the tiler has completed the preparation of the tile lists (lists of primitives to be processed for each tile), then each tile can be rendered.

To do this, each tile is processed by the graphics processing pipeline stages shown in FIG. 2 that follow the tiler 25.

Thus, when a given tile is being processed, each primitive that is to be processed for that tile (that is listed in a tile list for that tile) is passed to the rasteriser 26.

The rasterisation stage 26 of the graphics processing pipeline 3 operates to rasterise the primitives into individual graphics fragments for processing. To do this, the rasteriser 26 rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 27 performs a Z (depth) test on fragments it receives from the rasteriser 26, to see if any fragments can be discarded (culled) at this stage. To do this, it compares the depth values of (associated with) fragments issuing from the rasteriser 26 with the depth values of fragments that have already been rendered (these depth values are stored in a depth (Z) buffer that is part of the tile buffer 31) to determine whether the new fragments will be occluded by fragments that have already been rendered (or not). At the same time, an early stencil test is carried out.

Fragments that pass the fragment early Z and stencil test stage 27 are then sent to the fragment shading stage 28. The fragment shading stage 28 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 28 is in the form of a shader pipeline (a programmable fragment shader).

There is then a "late" fragment Z and stencil test stage 29, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 31 to determine whether the fragment data for the new fragments should replace the fragment data of the fragments that have already been rendered, by comparing the depth values of (associated with) fragments issuing from the fragment shading stage 28 with the depth values of fragments that have already been rendered (as stored in the depth buffer). This late fragment depth and stencil test stage 29 also carries out any necessary "late" alpha and/or stencil tests on the fragments.

The fragments that pass the late fragment test stage 29 are then subjected to, if required, any necessary blending operations with fragments already stored in the tile buffer 31 in the blender 30. Any other remaining operations necessary on the fragments, such as dither, etc. (not shown) are also carried out at this stage.

Finally, the (blended) output fragment data (values) are written to the tile buffer 31 from where they can, for example, be output to a frame buffer 33 for display. The depth value for an output fragment is also written appropriately to a Z-buffer within the tile buffer 31. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 31 is input to a downsampling (multisample resolve) write out unit 32, and thence output (written back) to an external memory output buffer, such as a frame buffer 33 of a display device (not shown). (The display device could comprise, e.g., a display comprising an array of pixels, such as a computer monitor or a printer.)

The downsampling and writeout unit 32 downsamples the fragment data stored in the tile buffer 31 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer 33 in a main memory) for storage, the next tile is then processed, and so on, until sufficient tiles have been processed to generate the entire render output (e.g. frame (image) to be displayed). The process is then repeated for the next render output (e.g. frame) and so on.

As can be seen from FIG. 2, the graphics processing pipeline 3 includes a number of programmable processing or "shader" stages, namely the vertex shader 20, hull shader 21, domain shader 23, geometry shader 24, and the fragment shader 28. These programmable shader stages execute respective shader programs that have one or more input variables and generate sets of output variables. Typically the shader program in question will be executed for each work item (e.g. vertex in the case of a vertex shader) to be processed. Typically an execution thread will be issued for each work item to be processed, and the thread will then execute the instructions in the shader program to produce the desired "shaded" output data.

The application 2 provides the shader programs to be executed using a high-level shader programming language, such as GLSL, HLSL, OpenCL, etc. These shader programs are then translated by a shader language compiler to binary code for the target graphics processing pipeline 3. This may include the creation of one or more internal (intermediate) representations of the program within the compiler. (The compiler may, e.g., be part of the driver 4, with there being a special API call to cause the compiler to run. The compiler execution can thus be seen as being part of the, e.g. draw call preparation done by the driver in response to API calls generated by an application).

Other arrangements for the graphics processor 3 would, of course, be possible.

The technology described herein relates to the situation in which the graphics processor 3 of FIG. 2 is being used to perform foveated rendering, by rendering a set of plural images that represent the same view of a scene, but at different resolutions, which different resolution views are then combined to provide an output foveated image in which the resolution varies across the image.

FIG. 3 shows an example foveated image, in which the fixation point (the region of highest resolution) 40 is towards the left hand side of the image. It can be seen that regions 41 of the image away from the fixation point are displayed with a lower resolution.

In the present embodiment, when performing foveated rendering, the graphics processor 3 is controlled to render plural, e.g. three, different resolution versions of the same view of a scene, with those different resolution images of the view then being appropriately combined (composited) to provide the output "foveated" image (output frame) that is, e.g., displayed.

Figure 4:
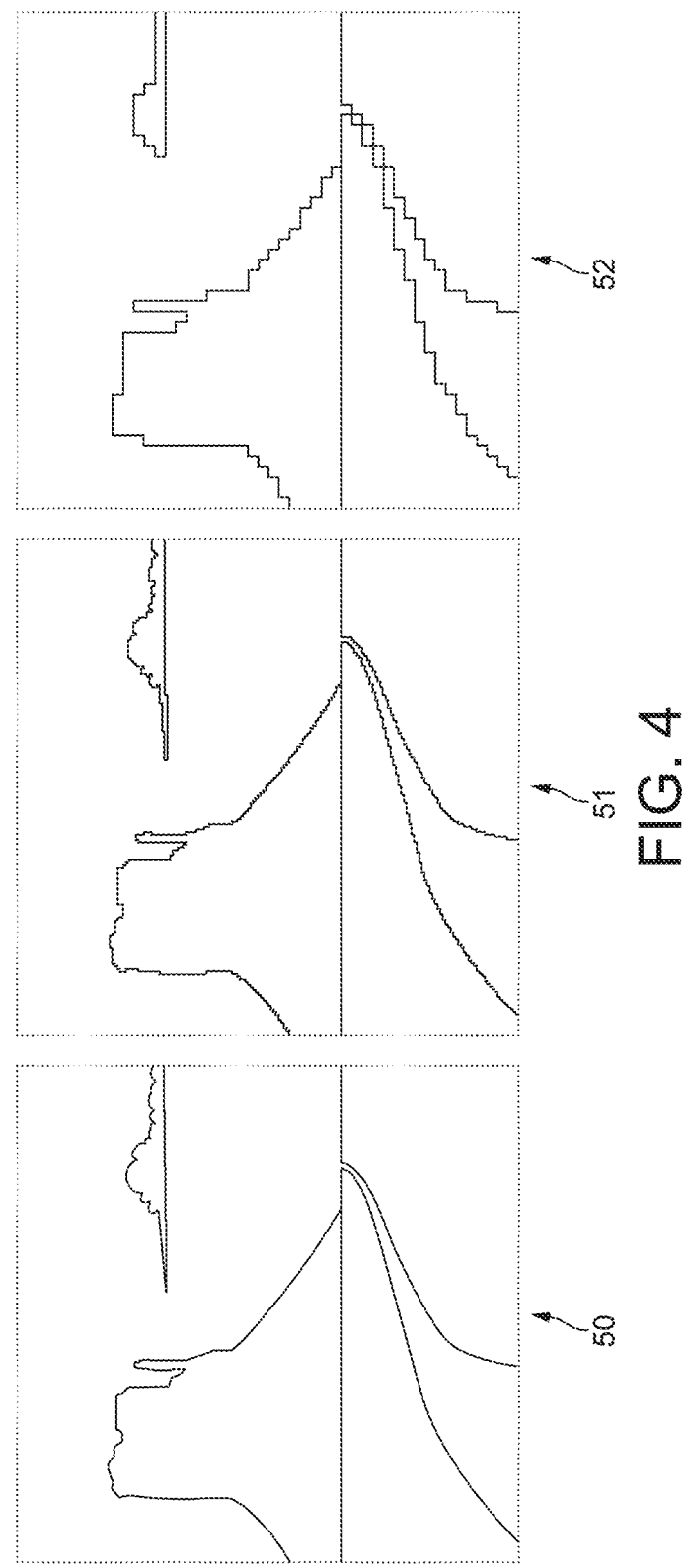
FIG. 4 shows an exemplary set of plural different resolution images of the same view that may be combined to provide a foveated image for display.

FIG. 4 shows an exemplary set of three different resolution images of the same view of a scene that may be combined to provide a foveated image for display. As shown in FIG. 4, three different resolution versions of the view will be generated, a highest resolution version of the view 50, a "middle" resolution view 51, and a lowest resolution version of the view 52. These different images may then be combined (composited) to provide the final, output "foveated" image for display. (In FIG. 4, the different resolution images are shown all scaled to the same size for comparison purposes.)

Figure 5:
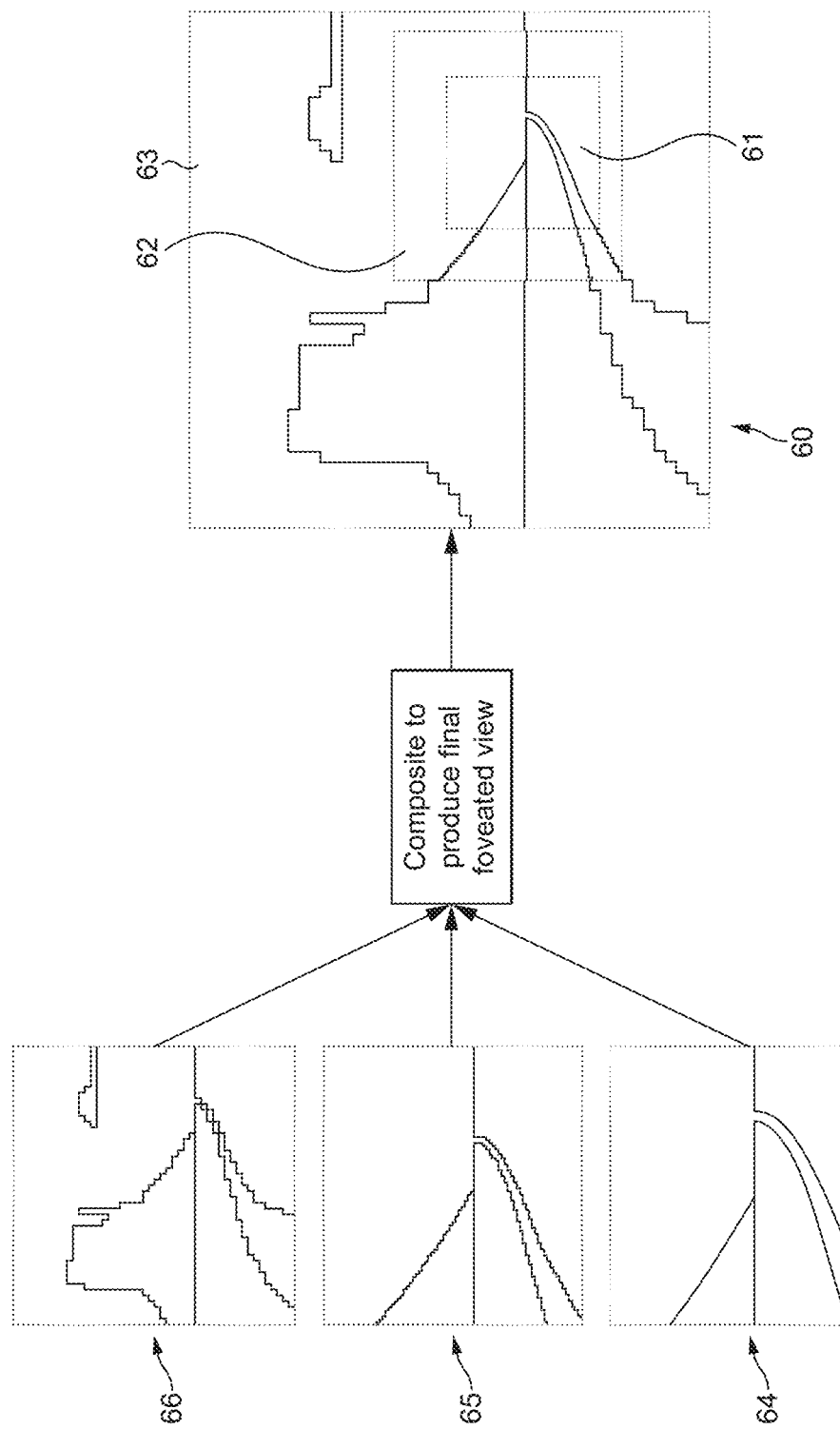
FIG. 5 shows schematically the compositing of images to provide a foveated image.

FIG. 5 shows schematically the compositing of different resolution images 64, 65, 66 corresponding to the images shown in FIG. 4 to provide a final, foveated output image (view) 60. As shown in FIG. 5, the final output, foveated view (image) 60 is made up of the different resolution images 64, 65 and 66, and each of the different resolution images 64, 65, 66 show different fields of view (parts) of the overall scene being rendered.

In particular, the appropriate region of the highest resolution view 64 is displayed in the region 61 of the output foveated view where, e.g., it is determined that the user is looking, with appropriate regions of the lower resolution views 65, 66, then being progressively displayed in regions 62, 63 of the output image 60 away from that highest resolution region 61.

Figure 6:
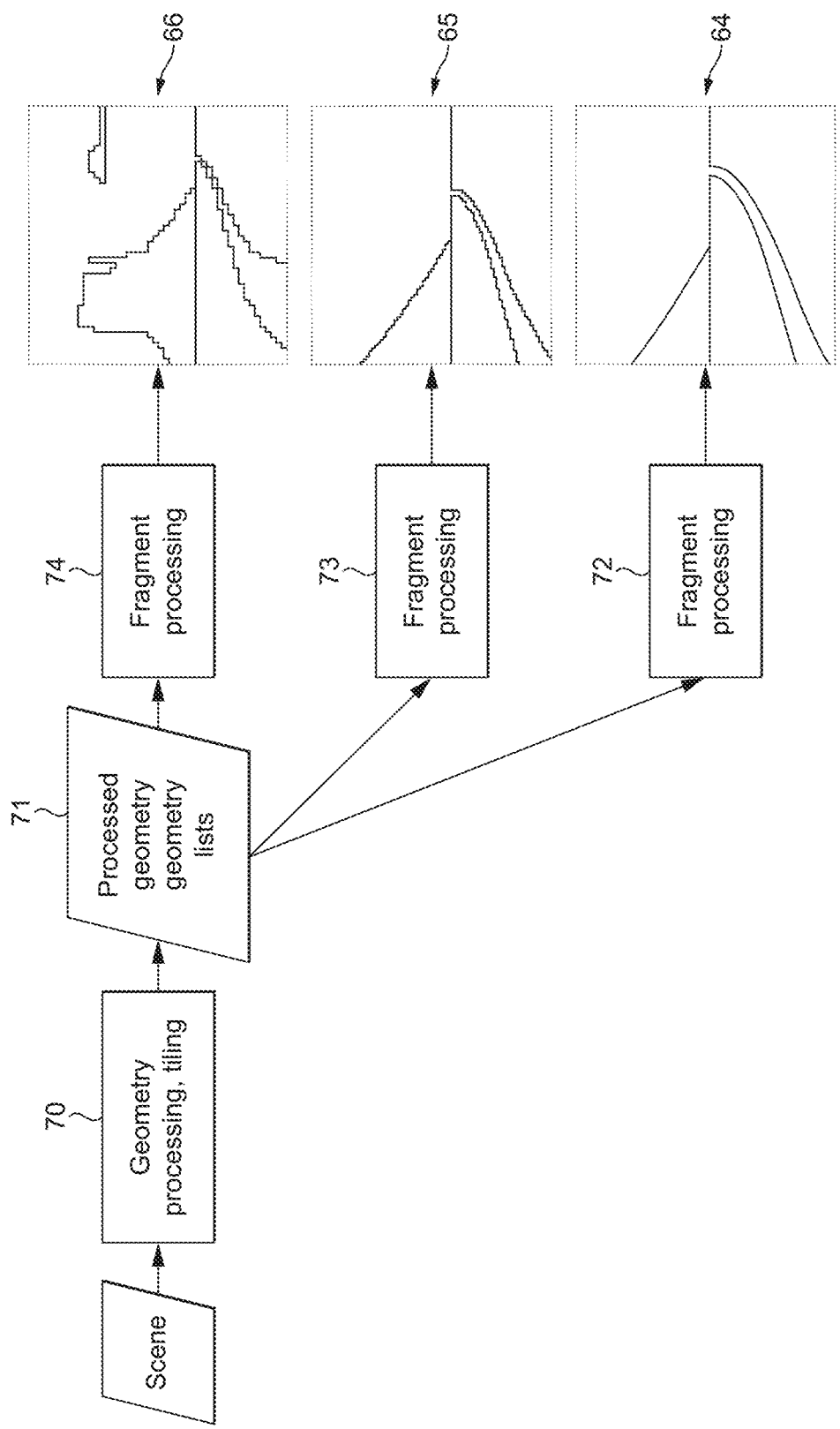
FIG. 6 shows schematically the rendering of a set of different resolution images for foveated rendering in an embodiment of the technology described herein.

FIG. 6 shows schematically the rendering of the three different resolution images 64, 65, 66 for displaying the output, final foveated view 60, in an embodiment of the technology described herein.

The fact that foveated rendering is required is indicated in the present embodiment by the application 2 that requires that rendering indicating to the driver 4 for the graphics processor 3 that the geometry for a scene is to be rendered to multiple views (surfaces) together with a scale factor associated with the foveal views (and any other rendering, etc., configurations that may be desired). In response to such commands from the application 2, the driver then configures appropriate tiling and rendering tasks that it sends to the graphics processor 3 to perform foveated rendering in the manner that will now be described.

As shown in FIG. 6, in this embodiment, and in accordance with the technology described herein, the geometry for the scene is processed and tiled (sorted into lists for respective rendering tiles of the images being rendered) only once (step 70), to provide a single set of tile geometry lists 71 that are then used in common (shared) when rendering each respective resolution image (for the fragment processing for rendering each respective resolution image) (steps 72, 73, 74).

In particular, the graphics processor 3 is controlled to perform both the vertex position processing (shading) and the geometry list (primitive lists) generation process (the tiling process) only once for the scene that is being rendered, at the highest resolution that is required for an output image.

These processes may be performed as desired, such as, and in an embodiment, in accordance with the normal operation of the graphics processor 3 for these processes, but will be done using the geometry for the scene at the highest resolution that is to be rendered for producing the final foveated view.

As shown in FIG. 6, once the geometry lists (the tile lists) have been prepared in this way, that single set of geometry lists (tile lists) is then used when rendering each respective different resolution image showing (some or all of) the view.

In this process, for the highest resolution view 64, the prepared geometry lists can simply be used as they are to identify the geometry that needs to be processed for each rendering tile when rendering that highest resolution image 64.

For the other, lower resolution images 65, 66, the geometry lists (and the geometry in those lists) that have been prepared at the highest resolution are used to identify and define geometry (primitives) to be rendered for the lower resolution images by scaling down the geometry in the "full" resolution geometry list by the appropriate scaling factor (that relates the resolution of the lower resolution image in question to the highest resolution for which the geometry lists have been prepared) (e.g. using linear scaling). This downscaling is done as part of the vertex position loading operation, but other arrangements would be possible, if desired.

As shown in FIG. 6, the rendering process for the different resolution images 64, 65, 66 is, in the present embodiment, further configured such that only some but not all of the "complete" image is rendered at the different respective resolutions. In particular, regions of the images which will be unused in the final composition are not rendered.

Figure 7:
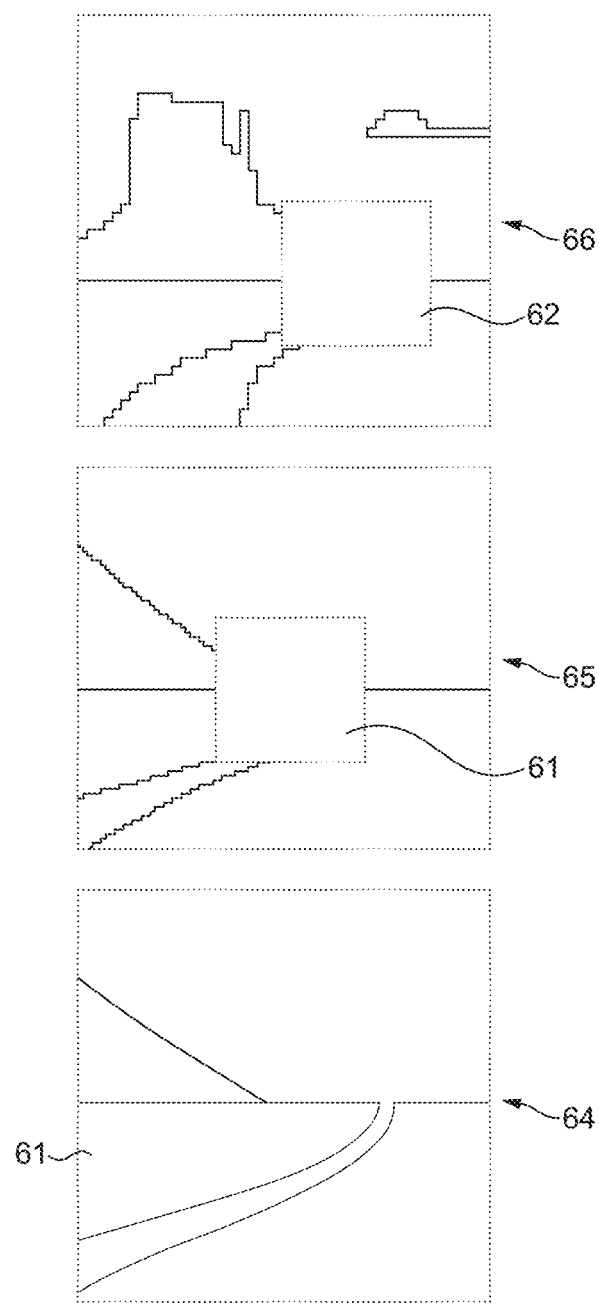
FIG. 7 shows schematically the rendering of a set of different resolution images for foveated rendering in an embodiment of the technology described herein.

FIG. 7 further illustrates this, and shows that, for example, only the part 61 of the highest resolution image that will be used to produce the final foveated view (as can be seen from FIG. 5) is rendered for the highest resolution image 64. Correspondingly, for the "middle" resolution image 65, the region 61 where the highest resolution image 64 will be displayed is omitted, and for the lowest resolution image 66, the region 62 where the highest and "middle" resolution images will be displayed is omitted (not rendered).

In the present embodiment, this rendering of only selected portions of each different resolution image is achieved by indicating for each rendering tile of the output image (frame), which resolution image or images should be produced for that tile location. This information is provided together with the geometry lists for the rendering tiles. Other arrangements, such as the driver for the graphics processor being configured to provide an appropriate list of tiles to be rendered when providing the rendering task to the graphics processor, and/or indicating a "render exclude region" that identifies an area within which tiles should not be rendered for an image could be used instead, if desired.

Once the (appropriate parts of each) different resolution images 64, 65, 66 have been rendered by the graphics processor 3, those images are stored, in the present embodiment, in appropriate frame buffers in memory of the graphics processing system. Those images are then be appropriately combined (composited) to provide the final, output, foveated view that will be displayed (as illustrated in FIG. 5).

In the present embodiment, the composition of the different resolution images of the view to provide the final, foveated output view is performed by the graphics processor treating each different resolution view as a graphics texture and then using a texture mapping operation (the texture mapping circuitry) (which will be implemented as part of the fragment shader 28) to appropriately sample and combine the different resolution images across the final, output foveated view to be displayed.

In particular, in the present embodiment, each different resolution image is stored as a mipmap level in a mipmap texture, and then the different images are appropriately sampled to generate the output, foveated view, by setting the level of detail for use when sampling the mipmap texture appropriately. In particular, the level of detail for the mipmap sampling process is set for each respective position across the output image such that the texture sampling operation will always sample the most detailed mipmap level (i.e. the most detailed resolution image) that has defined content (i.e. that has actual rendered fragment data) at that position and such that there will be a, relatively, smooth transition from one mipmap level (i.e. from one level of resolution image) to another.

Figure 8:
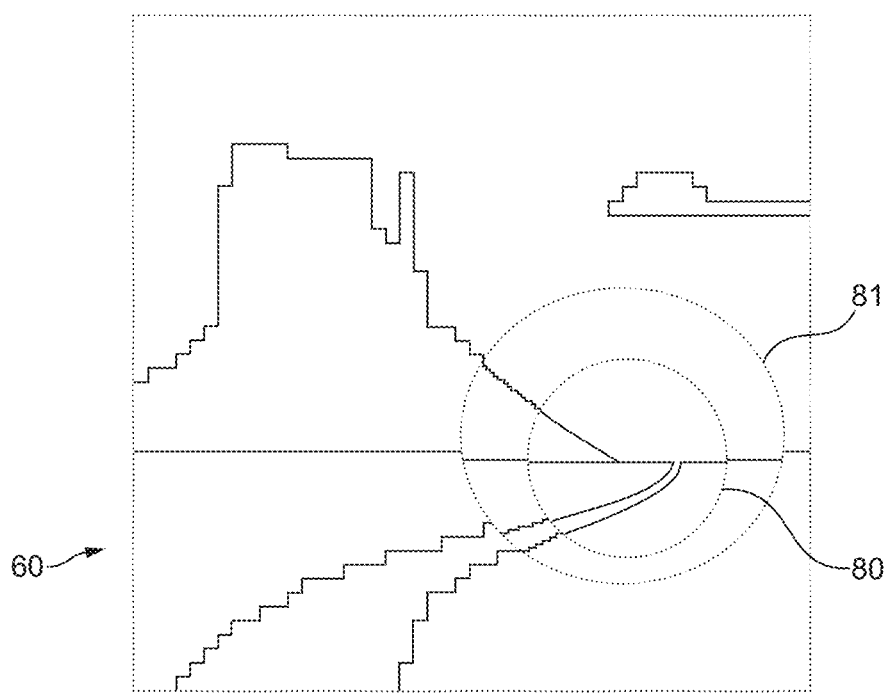
FIGS. 8, 9 and 10 show schematically the compositing of different resolution views to provide an output foveated image in an embodiment of the technology described herein.
Figure 9:
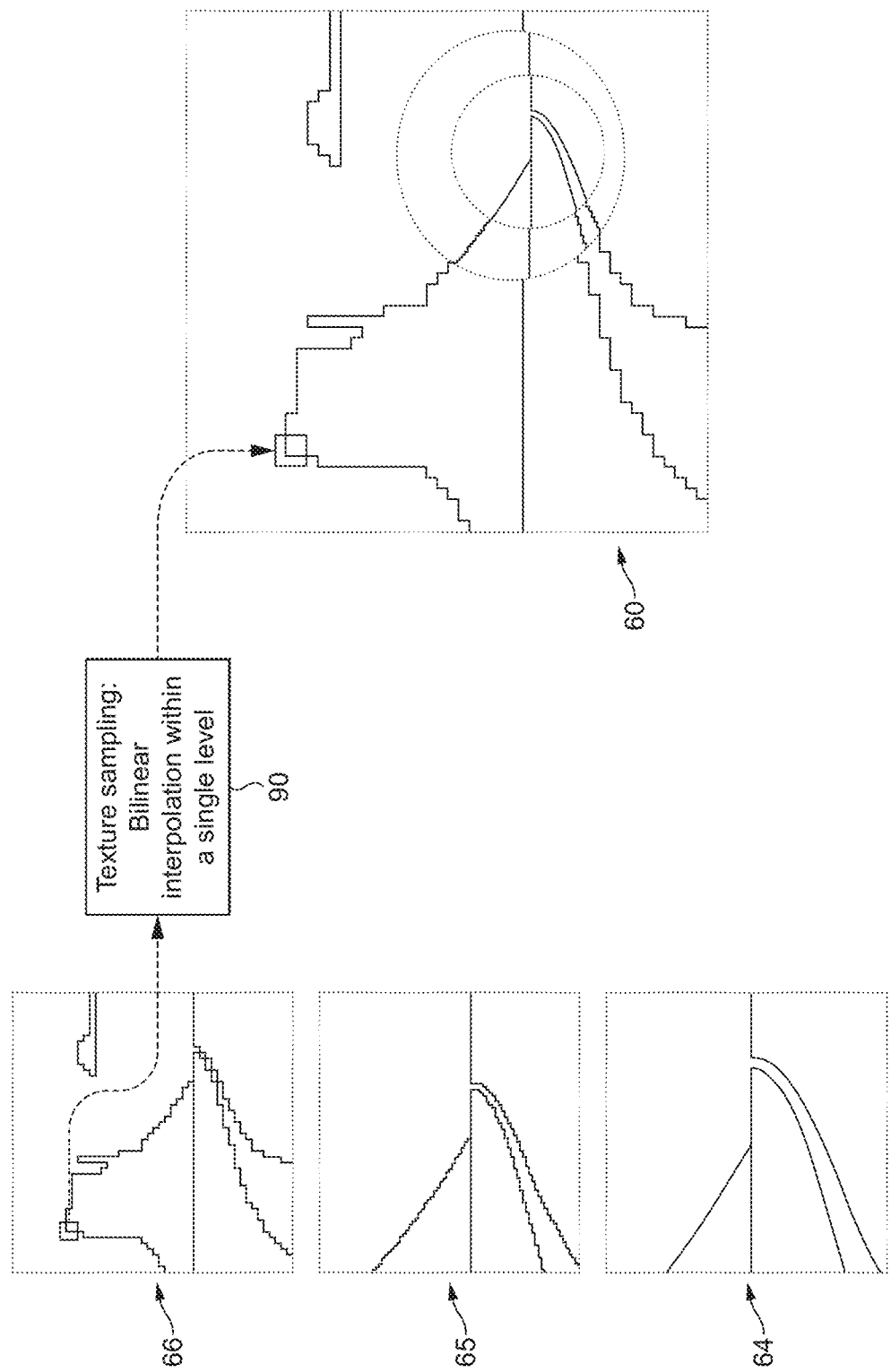
Figure 10:
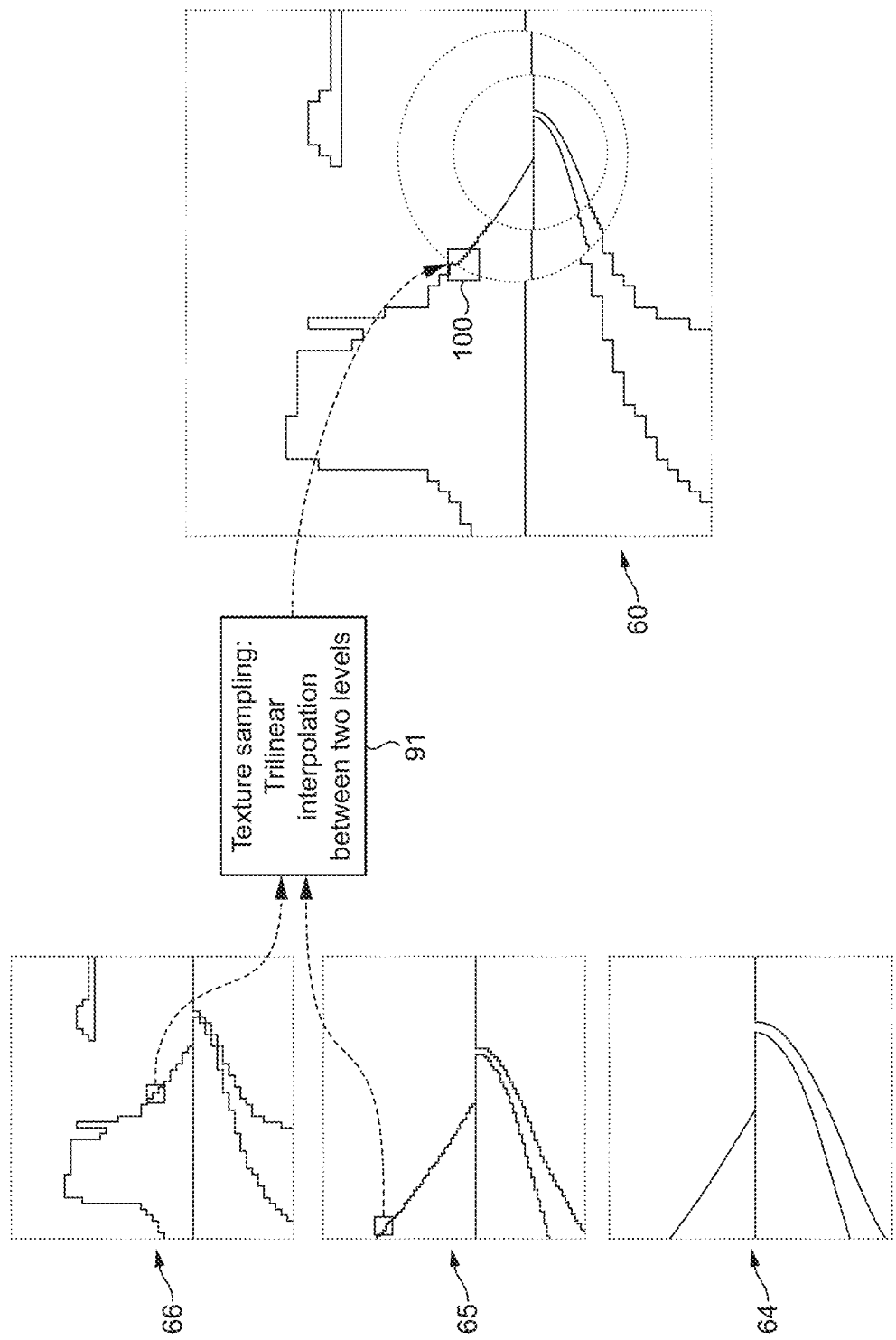

FIGS. 8, 9 and 10 illustrate this operation.

FIG. 8 shows the combining of the different resolution images using circular transition masks 80, 81. FIG. 9 shows the texture sampling operation 90 being configured to use bilinear interpolation where a single image (mipmap level) is being sampled for the final output, foveated image 60. FIG. 10 shows the level of detail being set such that tri-linear interpolation between two different mipmap levels (images) will be used for the texture sampling operation 91 in a region 100 where there is a transition between two different resolution images (two different mipmap levels) in the output, foveated view 60.

It can be seen from these figures that when performing such foveated rendering, the highest resolution image is not necessarily in the centre of the final output image that is displayed, but could be offset anywhere in the view, depending upon the position of the fixation point or points (which may, e.g., be determined through the use of gaze tracking sensors to identify where the viewer is actually looking).

The image or images and the level of detail to be used for which regions in the output frame (in the final output, foveated image 60) can be indicated, e.g., by the driver configuring the determination of the level of detail to use when sampling the images to be dependent upon the (s, t) texture coordinates that are being sampled, e.g. so that the highest resolution texture is sampled near the fixation point or points. The fixation point or points may be indicated to the driver e.g. by the application that is requesting the graphics processing, e.g. by indicating a rectangle where the highest resolution is desired. The driver would then configure the coefficients of the level of detail determination so that sampling the centre of that rectangle (the texture coordinates at the centre of that rectangle) would sample from the highest resolution texture, whereas sampling towards the edges of that rectangle would start to sample and interpolate between the highest and second highest resolution images, etc.

A number of variations, modifications, etc., to the above embodiments would be possible, if desired. For example, when preparing the geometry lists (performing the tiling operation), that process could be varied for different regions of the images being rendered based on the level of resolution that will be displayed for different regions of the image in the final output, foveated view. For example, geometry lists could be prepared for larger image sub-regions for those regions of the final output image that will be displayed at a lower resolution.

Similarly, the rendering configuration, such as the multisample count and/or whether per sample testing is enabled or disabled, could be adjusted depending upon the resolution of the image that is being rendered.

It would also be possible to move the image sub-region pattern (the tiling pattern) so that it is symmetric around the centre of the highest resolution (foveated) region of the scene that is to be displayed, instead of, e.g., simply starting at the top left part of the output frame. If the higher resolution region is, e.g., 512*512 sampling positions (e.g. pixels), then the image sub-region pattern for preparing the geometry lists could be set so that that high-resolution region is exactly covered by a single 512*512 sampling position image sub-region. This would then avoid, e.g., having multiple 512*512 sampling position image sub-regions covering the highest resolution image, with the edges between those regions passing through the highest resolution region at a potentially non-centred location.

Thus, in an embodiment of the technology described herein, the vertices for the geometry (primitives) to be rendered are rendered to the precision required for the highest resolution part of the image (i.e. the vertices are rendered as if all of the scene is to be rendered at the highest resolution), and, correspondingly, the geometry (primitive) lists are prepared as if the entire scene is to be rendered at the highest resolution that will be required, but then to make the processing of the lower resolution parts of the scene more efficient, the geometry list preparing operation (the tiling operation) and/or the rasterisation operation is adjusted.

In particular, when preparing the geometry lists (performing the tiling operation) for a part of the scene that will only display at a lower resolution, in an embodiment the smallest geometry list sub-region level is not used, such that, for example, for a region where the rendering will take place at half resolution in both directions, geometry lists are prepared for 32*32 sampling position (e.g. pixel) sub-regions, instead of 16*16 sampling position sub-regions, even if a primitive would fit in a 16*16 sampling position image sub-region.

It would also be possible to more aggressively cull geometry (e.g. primitives) in the lower-resolution regions (for example a primitive that would end up as one sampling position at the highest resolution may not be visible at lower resolutions).

Then, when rendering a tile for a lower resolution region of the image, e.g. at half resolution in both directions, the geometry list sub-regions are in an embodiment treated as being one step smaller than they really are. For example, a 32*32 sampling position image sub-region can be treated as if it is a 16*16 sampling position sub-region. The vertex coordinates will also, as discussed above, be scaled (before actual rasterisation) when rendering in this region.

In regions where images of two different resolutions are required, the geometry lists and the vertices will stay the same, but appropriate scaling will be applied when reading and rasterising the rendering tiles.

An example of such an arrangement when rendering an output frame that would be 4096*4096 sampling positions in size if not doing foveated rendering would be as follows.

Three different resolution images would be produced for the foveated rendering: a first image of 1024*1024 sampling positions at full resolution; a second image of 1024*1024 sampling positions at half resolution, covering 2048*2048 sampling positions of the full-resolution image, with a "hole" at the fixation point (e.g. in the centre); and a third image of 1024*1024 sampling positions at quarter resolution, covering 4096*4096 sampling positions of the full-resolution image, again with a "hole" around the fixation point (e.g. in the centre).

When producing these images, the vertex shading and geometry list preparation (tiling operation) would be performed at 4096*4096 resolution, but with adjustments for the image sub-regions being used in different regions of the overall image.

The full resolution image would be rendered as normal.

When rendering the half resolution image, 32*32 sampling position image sub-regions would be scaled down to 16*16 sampling position tiles on-the-fly, while rendering. (For the small area where this image overlaps with the full resolution image, 8*8 sampling position image sub-region geometry list "bins" would, in effect, be used.)

When rendering the quarter resolution image, 64*64 sampling position image sub-regions would be scaled down to 16*16 sampling position tiles on-the-fly, while rendering. Again for the small region where the quarter resolution image overlaps with the half resolution image, the process will use, in effect, 8*8 sampling position geometry list "bins".

It can be seen from the above that the technology described herein, in an embodiment, can provide a more efficient process and system for performing foveated rendering using tile-based graphics processors and graphics processing systems. This is achieved, in an embodiment of the technology described herein, by performing the geometry sorting (the tiling) process only once for the set of images that are being rendered to generate the output, foveated image, and then using that single set of geometry lists when rendering each different resolution image that is required to produce the final, output foveated image.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a tile-based graphics processor, the method comprising:
when the graphics processor is to render a set of plural images representing some or all of the same view of a scene but at different resolutions:
dividing the view of the scene into a plurality of sub-regions;
preparing graphics primitives to be rendered for the scene at a first resolution;
using the graphics primitives prepared at the first resolution to prepare, at the first resolution, a list of graphics primitives to be processed for each respective sub-region that the view of the scene has been divided into; and
rendering respective images representing the different resolution views of the scene, by rendering respective rendering tiles of each image, the rendering of a rendering tile comprising;
identifying, from the lists of graphics primitives that have been prepared at the first resolution for the sub-regions containing the rendering tile, the graphics primitives to be processed for that rendering tile; and then
processing the graphics primitives identified from the lists of graphics primitives that have been prepared for the scene to be rendered at the first resolution;
the method further comprising:
when rendering a rendering tile of an image of the set of images that has a different resolution than the first resolution:
identifying, from the lists of graphics primitives that have been prepared at the first resolution for the sub-regions containing the rendering tile, the graphics primitives at the first resolution to be processed for the rendering tile; and
processing the graphics primitives identified from the lists of graphics primitives that have been prepared at the first resolution to render the rendering tile of the image of the set of images that has a different resolution than the first resolution, wherein processing the graphics primitives identified from the lists of graphics primitives that have been prepared at the first resolution to render the rendering tile of the image of the set of images that has a different resolution than the first resolution comprises:
first scaling the graphics primitives that have been prepared at the first resolution identified from the lists of graphics primitives that have been prepared at the first resolution to the resolution of the different resolution image being rendered, and then processing the scaled graphics primitives that have been scaled to the different resolution to render the rendering tile of the image of the set of images that has a different resolution than the first resolution;
wherein processing the scaled graphics primitives that have been scaled to the different resolution to render the rendering tile of the image of the set of images that has a different resolution than the first resolution includes at least rasterising the scaled graphics primitives into graphics fragments, and then shading the graphics fragments to provide output rendered graphics fragment data.

2. The method of claim 1, wherein the first resolution that the lists of graphics primitives to processed are prepared at comprises the highest resolution that will be required for an image of the set of plural images representing some or all of the same view of the scene.

3. The method of claim 1, wherein the graphics primitive list preparing operation is configured to take account of where lower and higher resolution images of the view being rendered will be required in an output image comprising the combination of the images of the set of plural images.

4. The method of claim 1, comprising:
when using the graphics primitive lists that have been prepared at the first resolution when rendering an image of the set of images that has a lower resolution than the first resolution, scaling down the graphics primitives in the graphics primitive lists that have been prepared at the first resolution based on the resolution of the lower resolution image being rendered.

5. The method of claim 1, comprising:
rendering the highest resolution image of the set of images for a region comprising some but not all of the rendering tiles of an output image comprising the combination of the images of the set of plural images; and rendering the lower resolution image or images of the set of plural images for at least some of the rendering tiles of the output image that the highest resolution image has not been rendered for.

6. The method of claim 1, comprising:
indicating for each rendering tile of an output image comprising the combination of the images of the set of plural images which resolution image or images of the set of plural images should be rendered for that tile location.

7. The method of claim 1, comprising:
interleaving the rendering of the rendering tiles for the different resolution images.

8. The method of claim 1, comprising:
setting one or more rendering parameters for the rendering process for an image of the set of plural images based on the resolution of the image that is being rendered.

9. The method of claim 1, comprising:
combining the rendered images of the set of plural images to provide an output image comprising the combination of the images of the set of plural images for display using a texture mapping operation of the graphics processor.

10. The method of claim 9, comprising:
combining the different resolution images to provide the output image by treating the different resolution images of the set of images as respective mipmap levels of a set of mipmaps; and
generating the output image by sampling from the mipmap set.

11. The method of claim 10, comprising:
setting the sampling level of detail used when sampling the mipmap containing the different resolution images of the view such that at least the most detailed resolution image with rendered data for a given position in the output image will be sampled for that position.

12. The method of claim 10, wherein:
each different resolution image in the mipmap is configured to have the same physical size, but depending upon the resolution of the image, the data is then considered to be the centre of a larger virtual mipmap level, with the size of the larger virtual mipmap level being dependent upon the resolution of the image in question.

13. The method of claim 1, comprising:
generating two sets of plural different resolution images, one set corresponding to a left eye view, and the other set corresponding to a right eye view, for stereoscopic rendering.

14. A method of operating a graphics processing system, the graphics processing system comprising:
a host processor; and
a tile-based graphics processor;
the graphics processor comprising:
graphics primitive preparing circuitry for preparing graphics primitives to be rendered for a scene to be rendered;
graphics primitive list preparing circuitry for dividing a view of the scene to be rendered into a plurality of sub-regions and preparing lists of the graphics primitives to be processed for each respective sub-region of the view of the scene to be rendered; and
rendering circuitry for rendering tiles of images to be rendered using lists of graphics primitives to be processed for image sub-regions prepared by the graphics primitive list preparing circuitry;

the method comprising:
the host processor of the graphics processing system:
recognizing that an application executing on the host processor requires the graphics processor to render a set of plural images representing some or all of the same view of a scene but at different resolutions; and,
when it is recognized that the graphics processor is to render a set of plural images representing some or all of the same view of a scene but at different resolutions:
instructing the graphics processor to:
divide the view of the scene to be rendered into a plurality of sub-regions; prepare graphics primitives to be rendered for the scene at a first resolution;
using the graphics primitives prepared at the first resolution to prepare, at the first resolution, a list of graphics primitives to be processed for each respective sub-region that the view of the scene to be rendered has been divided into; and
render respective images representing the different resolutions of the scene by rendering respective rendering tiles of each image using the lists of graphics primitives to be processed for the image sub-regions that have been prepared for the scene to be rendered at the first resolution; and
the graphics processor, in response to being instructed by the host processor:
dividing, by the graphics primitive list preparing circuitry of the graphics processor, the view of the scene to be rendered into a plurality of sub-regions;
preparing, by the graphics primitive preparing circuitry of the graphics processor, graphics primitives to be rendered for the scene at the first resolution;
using the graphics primitives prepared at the first resolution to prepare, at the first resolution, by the graphics primitive list preparing circuitry of the graphics processor, a list of graphics primitives to be processed for each respective sub-region that the view of the scene to be rendered has been divided into;
rendering, by the rendering circuitry of the graphics processor, respective images representing the different resolution views of the scene by rendering respective rendering tiles of each image, the rendering of a rendering tile comprising;
identifying, from the lists of graphics primitives that have been prepared at the first resolution for the sub-regions containing the rendering tile, the graphics primitives to be processed for that rendering tile; and then
processing the graphics primitives identified from the lists of graphics primitives that have been prepared for the scene to be rendered at the first resolution; and
when rendering a rendering tile of an image of the set of images that has a different resolution than the first resolution;
identifying, from the lists of graphics primitives that have been prepared at the first resolution for the sub-regions containing the rendering tile, the graphics primitives at the first resolution to be processed for the rendering tile; and
processing the graphics primitives identified from the lists of graphics primitives that have been prepared at the first resolution to render the rendering tile of the image of the set of images that has a different resolution than the first resolution, wherein processing the graphics primitives identified from the lists of graphics primitives that have been prepared at the first resolution to render the rendering tile of the image of the set of images that has a different resolution than the first resolution comprises:
first scaling the graphics primitives that have been prepared at the first resolution identified from the lists of graphics primitives that have been prepared at the first resolution to the resolution of the different resolution image being rendered, and then processing the scaled graphics primitives that have been scaled to the different resolution to render the rendering tile of the image of the set of images that has a different resolution than the first resolution;
wherein processing the scaled graphics primitives that have been scaled to the different resolution to render the rendering tile of the image of the set of images that has a different resolution than the first resolution includes at least rasterising the scaled graphics primitives into graphics fragments, and then shading the graphics fragments to provide output rendered graphics fragment data.

15. A tile-based graphics processor, comprising:
graphics primitive preparing circuitry for preparing graphics primitives to be rendered for a scene to be rendered;
graphics primitive list preparing circuitry for dividing a view of the scene to be rendered into a plurality of sub-regions and preparing a list of graphics primitives to be processed for each respective sub-region that the view of the scene to be rendered has been divided into; and
rendering circuitry for rendering tiles of images to be rendered using lists of graphics primitives to be processed for image sub-regions prepared by the graphics primitive list preparing circuitry;
wherein:
the graphics primitive list preparing circuitry is further operable to, when the graphics processor is to render a set of plural images representing some or all of the same view of a scene but at different resolutions, use graphics primitives prepared at a first resolution to prepare, at the first resolution, lists of graphics primitives to be processed for each respective sub-region that the view of the scene has been divided into; and
the rendering circuitry is further operable to:
when the graphics processor is to render a set of plural images representing some or all of the same view of a scene but at different resolutions, render respective images representing the different resolution views of the scene, by rendering respective rendering tiles of each image, the rendering comprising;
identifying, from the lists of graphics primitives that have been prepared at the first resolution for the sub-regions containing the rendering tile, the graphics primitives to be processed for that rendering tile; and then
processing the graphics primitives identified from the lists of graphics primitives that have been prepared for the scene to be rendered at the first resolution; and
when rendering a rendering tile of an image of the set of images that has a different resolution than the first resolution:
identifying, from the lists of graphics primitives that have been prepared at the first resolution for the sub-regions containing the rendering tile, the graphics primitives at the first resolution to be processed for the rendering tile; and processing the graphics primitives identified from the lists of graphics geometry that have been prepared at the first resolution to render the rendering tile of the image of the set of images that has the different resolution than the first resolution, wherein processing the graphics primitives identified from the lists of graphics primitives that have been prepared at the first resolution to render rendering tile of the image of the set of images that has the different resolution than the first resolution comprises:
first scaling the graphics primitives that have been prepared at the first resolution identified from the lists of graphics primitives that have been prepared at the first resolution to the resolution of the different resolution image being rendered, and then processing the scaled graphics primitives that have been scaled to the different resolution to render the rendering tile of the image of the set of images that has a different resolution than the first resolution;
wherein processing the scaled graphics primitives that have been scaled to the different resolution to render the rendering tile of the image of the set of images that has a different resolution than the first resolution includes at least rasterising the scaled graphics primitives into graphics fragments, and then shading the graphics fragments to provide output rendered graphics fragment data.

16. The graphics processor of claim 15, wherein the first resolution that the lists of graphics primitives to processed are prepared at comprises the highest resolution that will be required for an image of the set of plural images representing some or all of the same view of the scene.

17. The graphics processor of claim 15, wherein the graphics primitive list preparing circuitry is configured to take account of where lower and higher resolution images of the view being rendered will be required in an output image comprising the combination of the images of the set of plural images.

18. The graphics processor of claim 15, further comprising:
texture mapping circuitry; and
wherein:
the graphics processor is configured to combine the rendered images of the set of plural images to provide an output image comprising the combination of the images of the set of plural images for display using the texture mapping circuitry of the graphics processor.

19. A virtual reality display device comprising:
a graphics processor;
a host processor; and
a display;
the graphics processor comprising:
graphics primitive preparing circuitry for preparing graphics primitives to be rendered for a scene to be rendered;
graphics primitive list preparing circuitry for dividing a view of the scene to be rendered into a plurality of sub-regions and preparing a list of graphics primitives to be processed for each respective sub-region that the view of the scene to be rendered has been divided into; and
rendering circuitry for rendering tiles of images to be rendered using lists of graphics primitives to be processed for image sub-regions prepared by the graphics primitive list preparing circuitry;

the graphics processing system further comprising:
processing circuitry configured to:
  recognize when the graphics processor is to render a set of plural images representing some or all of the same view of a scene but at different resolutions; and to,
  when it is recognized that the graphics processor is to render a set of plural images representing some or all of the same view of a scene but at different resolutions:
    cause the graphics primitive preparing circuitry to prepare graphics primitives to be rendered for the scene at a first resolution;
    cause the graphics primitive list preparing circuitry of the graphics processor to divide the view of the scene to be rendered into a plurality of sub-regions and use the graphics primitives prepared at the first resolution to prepare, at the first resolution, lists of the graphics primitives to be processed for each respective sub-region that the view of the scene has been divided into; and
  cause the rendering circuitry of the graphics processor to:
    render respective images representing the different resolution views of the scene by rendering respective rendering tiles of each image, the rendering comprising;
      identifying, from the lists of graphics primitives that have been prepared at the first resolution for the sub-regions containing the rendering tile, the graphics primitives to be processed for that rendering tile; and then
      processing the graphics primitives identified from the lists of graphics primitives to be processed for the image sub-regions that have been prepared for the scene to be rendered at the first resolution; and
    when rendering a rendering tile of an image of the set of images that has a different resolution than the first resolution:
      identifying, from the lists of graphics primitives that have been prepared at the first resolution for the sub-regions containing the rendering tile, the graphics primitives at the first resolution to be processed for the rendering tile; and
      processing the graphics geometry in the lists of graphics primitives that have been prepared at the first resolution to render the rendering tile of the image of the set of images that has the different resolution than the first resolution, wherein processing the graphics primitives identified from the lists of graphics primitives that have been prepared at the first resolution to render the rendering tile of image of the set of images that has the different resolution than the first resolution comprises:
        first scaling the graphics primitives that have been prepared at the first resolution identified from the lists of graphics primitives that have been prepared at the first resolution to the resolution of the different resolution image being rendered, and then processing the scaled graphics primitives that have been scaled to the different resolution to render the rendering tile of the image of the set of images that has a different resolution than the first resolution;
        wherein processing the scaled graphics primitives that have been scaled to the different resolution to render the rendering tile of the image of the set of images that has a different resolution than the first resolution includes at least rasterising the scaled graphics primitives into graphics fragments, and then shading the graphics fragments to provide output rendered graphics fragment data.

20. A non-transitory computer readable storage medium storing computer software code which when executing on a processor performs a method of operating a tile-based graphics processor, the method comprising:
  when the graphics processor is to render a set of plural images representing some or all of the same view of a scene but at different resolutions:
    dividing the view of the scene into a plurality of sub-regions;
    preparing graphics primitives to be rendered for the scene at a first resolution;
    using the graphics primitives prepared at the first resolution to prepare, at the first resolution, a list of graphics primitives to be processed for each respective sub-region that the view of the scene has been divided into; and
  rendering respective images representing the different resolution views of the scene, by rendering respective rendering tiles of each image, the rendering of a rendering tile comprising;
    identifying, from the lists of graphics primitives that have been prepared at the first resolution for the sub-regions containing the rendering tile, the graphics primitives to be processed for that rendering tile; and then
    processing the graphics primitives identified from the lists of graphics primitives that have been prepared for the scene to be rendered at the first resolution; the method further comprising:
  when rendering a rendering tile of an image of the set of images that has a different resolution than the first resolution:
    identifying, from the lists of graphics primitives that have been prepared at the first resolution for the sub-regions containing the rendering tile, the graphics primitives at the first resolution to be processed for the rendering tile; and
    processing the graphics primitives identified from the lists of graphics primitives that have been prepared at the first resolution to render the rendering tile of the image of the set of images that has a different resolution than the first resolution, wherein processing the graphics primitives identified from the lists of graphics primitives that have been prepared at the first resolution to render the rendering tile of the image of the set of images that has a different resolution than the first resolution comprises:
      first scaling the graphics primitives that have been prepared at the first resolution identified from the lists of graphics primitives that have been prepared at the first resolution to the resolution of the different resolution image being rendered, and then processing the scaled graphics primitives that have been scaled to the different resolution to render the rendering tile of image of the set of images that has a different resolution than the first resolution;
      wherein processing the scaled graphics primitives that have been scaled to the different resolution to render the rendering tile of the image of the set of images that has a different resolution than the first resolution includes at least rasterising the scaled graphics primitives into graphics fragments, and then shading the graphics fragments to provide output rendered graphics fragment data.

* * * * *

UNITED STATES PATENT AND TRADEMARK OFFICE
CERTIFICATE OF CORRECTION

PATENT NO. : 11,010,959 B2  
APPLICATION NO. : 15/497129  
DATED : May 18, 2021  
INVENTOR(S) : Kakarlapudi et al.

Page 1 of 1

It is certified that error appears in the above-identified patent and that said Letters Patent is hereby corrected as shown below:

In the Claims

Column 29, Line 65 (Claim 1): please change "comprising;" to --comprising:--

Column 30, Line 45 (Claim 2): please insert --be-- before "processed"

Column 34, Line 8 (Claim 15): please insert --the-- before "rendering"

Column 34, Line 30 (Claim 16): please insert --be-- before "processed"

Column 35, Line 52 (Claim 19): please insert --the-- before "image"

Column 36, Line 60 (Claim 20): please insert --the-- before "image"

Signed and Sealed this  
Seventh Day of September, 2021

Drew Hirshfeld  
*Performing the Functions and Duties of the  
Under Secretary of Commerce for Intellectual Property and  
Director of the United States Patent and Trademark Office*